US009830351B2

(12) United States Patent
White et al.

(10) Patent No.: US 9,830,351 B2
(45) Date of Patent: Nov. 28, 2017

(54) SYSTEM AND METHOD FOR GENERATING A PLAYLIST FROM A MOOD GRADIENT

(71) Applicant: EXCALIBUR IP, LLC, New York, NY (US)

(72) Inventors: William White, Berkeley, CA (US); Malcolm Slaney, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/072,981

(22) Filed: Nov. 6, 2013

(65) Prior Publication Data

US 2014/0189512 A1    Jul. 3, 2014

Related U.S. Application Data

(63) Continuation of application No. 11/849,006, filed on Aug. 31, 2007, now Pat. No. 8,583,615.

(51) Int. Cl.
*G06F 17/30* (2006.01)
*G11B 27/10* (2006.01)
*G06F 3/0481* (2013.01)
*G06F 3/0484* (2013.01)

(52) U.S. Cl.
CPC ...... *G06F 17/30386* (2013.01); *G06F 3/0484* (2013.01); *G06F 3/04815* (2013.01); *G06F 3/04817* (2013.01); *G06F 17/30017* (2013.01); *G06F 17/30743* (2013.01); *G06F 17/30749* (2013.01); *G06F 17/30758* (2013.01); *G06F 17/30769* (2013.01); *G06F 17/30772* (2013.01); *G06F 17/30775* (2013.01); *G11B 27/105* (2013.01)

(58) Field of Classification Search
CPC ......... G06F 17/30743; G06F 17/30772; G06F 3/04815
USPC .................................................. 707/705, 748
See application file for complete search history.

(56) References Cited

U.S. PATENT DOCUMENTS

| | | | |
|---|---|---|---|
| 2002/0054164 A1* | 5/2002 | Uemura ........................ 345/848 |
| 2004/0237759 A1* | 12/2004 | Bill ................................. 84/668 |
| 2005/0038819 A1* | 2/2005 | Hicken et al. ............. 707/104.1 |
| 2006/0112098 A1* | 5/2006 | Renshaw et al. ................. 707/7 |
| 2006/0143647 A1* | 6/2006 | Bill ............................... 725/10 |
| 2006/0195479 A1* | 8/2006 | Spiegelman et al. ...... 707/104.1 |

(Continued)

*Primary Examiner* — Mahesh Dwivedi
(74) *Attorney, Agent, or Firm* — James J. DeCarlo; Greenberg Traurig, LLP

(57) ABSTRACT

Systems and methods for generating and playing a sequence of media objects based on a mood gradient are also disclosed. A mood gradient is a sequence of items, in which each item is media object having known characteristics or a representative set of characteristics of a media object, that is created or used by a user for a specific purpose. Given a mood gradient, one or more new media objects are selected for each item in the mood gradient based on the characteristics associated with that item. In this way, a sequence of new media objects is created but the sequence exhibits a similar variation in media object characteristics. The mood gradient may be presented to a user or created via a display illustrating a three-dimensional space in which each dimension corresponds to a different characteristic. The mood gradient may be represented as a path through the three-dimensional space and icons representing media objects are located within the three-dimensional space based on their characteristics.

20 Claims, 10 Drawing Sheets

(56) References Cited

U.S. PATENT DOCUMENTS

| | | |
|---|---|---|
| 2007/0022156 A1* | 1/2007 | Grubbs ........................ 709/203 |
| 2007/0143183 A1* | 6/2007 | Ryu et al. ....................... 705/14 |
| 2007/0182741 A1* | 8/2007 | Chosokabe ................... 345/440 |
| 2008/0021851 A1* | 1/2008 | Alcalde et al. ................. 706/21 |
| 2008/0126384 A1* | 5/2008 | Toms et al. ................... 707/102 |
| 2008/0201370 A1* | 8/2008 | Kemp et al. ............... 707/104.1 |
| 2009/0069914 A1* | 3/2009 | Kemp et al. .................... 700/94 |
| 2009/0076821 A1* | 3/2009 | Brenner et al. ............... 704/260 |
| 2010/0168879 A1* | 7/2010 | Takatsuka et al. ............. 700/94 |

* cited by examiner

SYSTEM AND METHOD FOR GENERATING A PLAYLIST FROM A MOOD GRADIENT

CROSS REFERENCE TO RELATED APPLICATIONS

This application claims priority from co-pending U.S. patent application Ser. No. 11/849,006, filed Aug. 31, 2007, entitled SYSTEM AND METHOD FOR GENERATING A PLAYLIST FROM A MOOD GRADIENT, the entire contents of which are hereby incorporated by reference.

BACKGROUND

With the emergence of digital media, that is audio, video (audiovisual) and text content stored digitally, users now have virtually unlimited choices. There is more media, in the form of electronic files and objects, available to users now than they could be expected to consume in a lifetime. However, users can only experience media which they are able to find. Traditional media discovery involves searching for a track by its title and/or creator, which information is often stored as metadata in a media file. Yet for the majority of audio files on the web, there is no such information or metadata. This is because the generation of metadata is a time consuming, typically manual task that is often omitted by a media object's creator. There are millions of web media objects which are poorly annotated or lacking in any type of metadata whatsoever. These media will never be returned in any search result. There are also millions of "long tail" tracks which may be properly annotated but are generally unknown and will therefore fall to the bottom of any search query and, thus, for all intents and purposes rarely or never be selected by users.

SUMMARY

Systems and methods for presenting media information to users that fosters discovery of new media and a media discovery interface are disclosed. Media objects such as songs are analyzed to determine a set of three or more objective characteristics that describe the media object. Icons representing the media objects are then presented to a user in display illustrating a three-dimensional space in which each dimension corresponds to a different characteristic and the icons are located within the three-dimensional space based on their characteristics. In this way, media objects having similar characteristics are located near each other within the three-dimensional space allowing the user to see and access similar media objects quickly and easily. Because the display does not rely on previously-generated metadata stored in a media file in a known format, the user may be shown media objects that have never been classified by users or which are relatively unknown to the general population of users.

Systems and methods for generating and playing a sequence of media objects based on a mood gradient are also disclosed. A mood gradient is a sequence of items which can be considered locations in n-dimensional space, in which each item is a representative set of characteristics of a media object, that is created or used by a user for a specific purpose. Given a mood gradient, one or more new media objects are selected for each item in the mood gradient based on the characteristics associated with that item. In this way, a sequence of new media objects is created but the sequence exhibits a similar variation in media object characteristics. The mood gradient may be presented to a user or created via a display illustrating a three-dimensional space in which each dimension corresponds to a different characteristic. The mood gradient may be represented as a path through the three-dimensional space and icons representing media objects are located within the three-dimensional space based on their characteristics.

In one aspect, the disclosure describes a method for rendering to a user a playlist of songs, including a first song and a second song. The method includes receiving a user command to render the songs in the playlist and playing a first song and a second song in the playlist via a sound generation device. In response to receiving the user command to render, the method generates, based on an analysis of the songs in the playlist, a first value for each of at least three objective characteristics of the first song and a second value for each of the at least three objective characteristics of the second song. The method also displays the first song as a first icon in a three-dimensional space of a user interface located at a first point in the three-dimensional space based on three of the first values. In addition, the method includes displaying the second song as a second icon located at a second point in the three-dimensional space of the user interface based on three of the second values.

In another aspect, the disclosure describes a computer-readable medium storing computer executable instructions for a method of rendering media objects. The method includes receiving a user command to render a first media object and rendering the first media object to a user. In response to receiving the user command to render, the method generates at least three values, each value representing a different objective characteristic of the first media object determined based on an analysis of the first media object. The information identifying the first media object and the generated values is then transmitted to a remote datastore, whereby the remote datastore is populated with values for the media objects rendered and analyzed by the rendering device or devices performing the method, such as client computing devices using local media players to render media objects.

The method may further include retrieving the media object from a remote location, wherein the information identifying the first media object includes an identification of the remote location. The method may also include generating a graphical user interface illustrating a three-dimensional space on a display device wherein each dimension of the three-dimensional space corresponds to a different objective characteristic and displaying the first media object as a first icon in the three-dimensional space located at a first point in the three-dimensional space based on the generated value for the objective characteristic corresponding to each dimension. The method may also include retrieving previously generated values for second media objects and displaying each of the second media objects as second icons in the three-dimensional space at different second points based on the retrieved values for the second media objects.

In another aspect, the disclosure describes a media rendering system that includes: a sound reproduction device that receives an electronic signal and generates sound therefrom; a media player that renders media objects to generate the electronic signal and passes the electronic signal to the sound reproduction device; an analysis module that analyzes the media objects and, for each media object, generates a value for each of at least three objective characteristics: and a user interface module that generates a three-dimensional user interface in a display device connected to the media rendering system, in which the user interface is configured to represent a three-dimensional space including at least one first control representing a first media object located in the three-dimensional space based on the values of three of the objective characteristics of the first media object.

The user interface module of the rendering system may further generate a plurality of second controls, in which each second control represents a different second media object located in the three-dimensional space based on values of three of the objective characteristics of the different second media object. The media player may be further configured to retrieve media objects from a remote storage location and provide the media objects to the analysis module in response to user commands to render the media objects. The analysis module may also transmit the values generated to a remote datastore and request predetermined values for media objects from the remote datastore.

In another aspect, the disclosure describes a user interface stored as executable instructions in a memory of a computing system. The user interface includes: a first display area illustrating a three-dimensional graphical space; and a plurality of controls illustrated in the three-dimensional graphical space, for which each control corresponds to a different media object, each media object is described by a different set of values, and each value is associated with a different objective characteristic of the media object. In addition, each dimension of the three-dimensional graphical space corresponds to a different objective characteristic and each location within the three-dimensional graphical space corresponds to a different set of values. Furthermore, each of the plurality of controls is located within the three-dimensional graphical space based on its associated set of values. Through the user interface, selection of a control causes that selected control's corresponding media object to be rendered.

The user interface may further display a path illustrated through the three-dimensional graphical space linking at least two of the plurality of controls. If the media objects are songs, then at least one of the objective characteristics may be selected from tempo, brightness, beatedness, spectral centroid, spectral rolloff, spectral flux, and zero crossings. If the media objects are songs, then at least one of the plurality of controls may be derived from an image associated with the corresponding media object. The user interface may be part of a media player or a rendering device that renders media objects including songs.

In another aspect, the disclosure describes a method of generating a playlist of songs from a mood gradient. The method includes receiving a request for a playlist of songs and retrieving a defined mood gradient containing a sequence of target value sets, in which each target value set includes a plurality of values and each value represents a different objective musical characteristic. For each target value set in the mood gradient, the method selects a song based on the plurality of values in the target value set. The playlist of songs is then generated, in which the playlist contains each selected song in the sequence of the mood gradient.

The method further may include identifying a user associated with the request and selecting the defined mood gradient based on the user associated with the request. In the method, retrieving a defined mood gradient may also include selecting the defined mood gradient based on a mood gradient identifier contained in the request. Selecting a song may include generating, based on audio data for each of a plurality of songs, a song value set associated with each song, in which each song value set includes a plurality of values—each value representing a different objective musical characteristic of the associated song, and comparing the target value set to each of the song values sets. The method may include selecting the song having the song value set that most closely matches the target value set. The method may further include identifying a set of similar songs having song value sets within a predetermined variation of the target value set and randomly selecting the song from the set of similar songs. Alternatively, the method may include filtering the set of similar songs based on one or more filter criteria and selecting the song from the filtered set of similar songs.

In another aspect, the disclosure describes a computer-readable medium storing computer executable instruction for a method of storing playlist data. The method includes receiving a request to create a mood gradient and receiving a selection of songs in a sequence. In response, the method includes generating, based on audio data for each song in the sequence, a target value set associated with each song, wherein each target value set includes a plurality of values in which each value represents a different objective musical characteristic of the associated song. The target value sets and the sequence are then stored as the mood gradient.

In the method, the operation of receiving a selection of songs may also include displaying in a graphical user interface a plurality of songs including a first song and a second song as icons in a three-dimensional space. A first user selection of a first icon in the graphical user interface representing the first song and a second user selection of a second icon in the graphical user interface representing a second song may be received. The method then may display a path through the three-dimensional space between the first icon and the second icon.

The method may also include accessing a datastore of value sets for different songs, searching the datastore for value sets for at least one song in the sequence and retrieving the target value sets associated with the at least one song in the sequence. The method may also include storing the mood gradient with information identifying a user associated with the request. The method may further include storing the mood gradient in location remote from the computer-readable medium.

In another aspect, the disclosure describes a system for generating a playlist. The system includes an analysis module that analyzes songs and, for each song, generates a value set, wherein each value set including a value for each of at least three objective characteristics of the associated song; a datastore containing plurality of value sets, in which each value set is associated with a different song; a user interface module that receives a user selection of a mood gradient, in which the mood gradient identifies a group of objective characteristic value sets in a sequence; and a playlist generator module that selects a recommended song corresponding to each value set of the mood gradient. In the system, the playlist generator module may also generate a playlist including the recommended songs corresponding to each of the group of objective characteristic value sets in the sequence.

The user interface module of the system may further generate a three-dimensional user interface in a display device connected to the media rendering system, wherein the user interface is configured to represent a three-dimensional space including at least one first icon representing a first song located in the three-dimensional space based on the values of three of the objective characteristics of the first song. The user interface module may further receive from the user a first selection of songs in a sequence and a request to generate a playlist containing a second selection of songs based on the first selection of songs.

The system may further include a media player that renders songs in accordance with commands received from a user, wherein the user interface module provides an interface for the media player through which the user may control the selection and rendering of songs to the user.

The disclosed systems and methods enhance more traditional playback experiences. For instance, knowledge of the characteristics of the songs may be used to find the smoothest path between all the tracks in a given playlist. This allows the system to automatically sort their records by a characteristic such as beats per minute and play a continuous stream of music at a consistent tempo, adjusting slightly from one song to the next. Taking this one step further, auto-generated playlists may be humanized, taking a list of tracks that fall within a certain genre, were released in a specific year or are recommended for a specific user and then use tempo, beatedness, brightness and any other characteristic to intelligently sort the music. The result is a smoother and more enjoyable music playback experience. An extension of this would be to allow the user to draw a tempo gradient on the screen, essentially corresponding to an evolving musical atmosphere which they would like created. The system can then generate a playlist of tracks filtered by any desired criteria and sorted in such a manner as to take the user on a "musical voyage", as per their desired playlist mood curve. Different mood curves could be used to deliver appropriate content based upon the specific context of the activity the user is engaged in. One can imagine different mood curves for working out, entertaining, romantic dinners, getting ready to go out or simply relaxing on a quiet Sunday afternoon.

Whereas current applications have been based around the concept of a user initiating a music playback experience and then sitting back and passively listening to it, the disclosed systems extend this idea even further to facilitate active music discovery experiences using engaging user interface components. One instance of this would be a "genre discovery" interface where users navigate between clusters of tracks within a specific genre in three-dimensional space where the x, y and z axes correspond to normalized values of tempo, beatedness and brightness for the given result set and different genres are represented by different colored nodes in the space.

Another technique is to display audio search results in this three-dimensional space. This would facilitate a truly free and engaging system for discovering media that one would otherwise not be able to easily find and categorize. The dimensions of this space could represent tempo, beatedness and brightness or any other audio features that can be calculated. By simply changing a dimension from one audio feature to the next the entire space may be reshaped, creating completely new result sets. All those media tracks out there with no metadata, which would otherwise be relegated to the back end of an audio search result set and never be seen, are now accessible through the novel interface which makes finding new music amusing entertainment in and of itself.

These and various other features as well as advantages will be apparent from a reading of the following detailed description and a review of the associated drawings. Additional features are set forth in the description that follows and, in part, will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the disclosure in any manner, which scope shall be based on the claims appended hereto.

DETAILED DESCRIPTION

Systems and methods for presenting media information to users that fosters discovery of new media and a media discovery interface are disclosed herein. The content of the media is analyzed in order to determine at least three different objective characteristics of the media. Each of the items of media (media objects) are then displayed to a user, via a media discovery interface, as if they were in three-dimensional space with each dimension corresponding to one of the characteristics. The media objects are located within the space based on their values for each of the characteristics. The media discovery interface allows users to visually see media objects that have similar content and thereby be alerted to the existence of media objects that the user may be interested in. Furthermore, the interface includes additional novel functionality such as showing a path through the three-dimensional space linking media objects that are to be played in a playlist and allowing the user to select different characteristics for use in displaying the media objects.

For the purposes of this disclosure, the term media object refers to an individual item of media having characteristics that can be objectively analyzed. A media object may be a true media object such as an audio file containing a song in .mp3, format, .wav format or some other known audio format. A media object may also be a video file containing a video clip or a movie in .mp4 or .avi format or some other video format. Depending on the embodiment, a media object may be media data streamed to the rendering device. Alternatively, the media object could be some other object of a known type such as a book or other physical product. In theory, the method could be adapted to display the similarity or make recommendations based on any type of objects.

In this disclosure, however, for ease of reading embodiments of systems and methods are described specifically with reference to media objects that are in the form of individual songs. One skilled in the art will recognize that the systems and methods are not so limited and may be adapted to any media type including video and text media.

Figure 1:
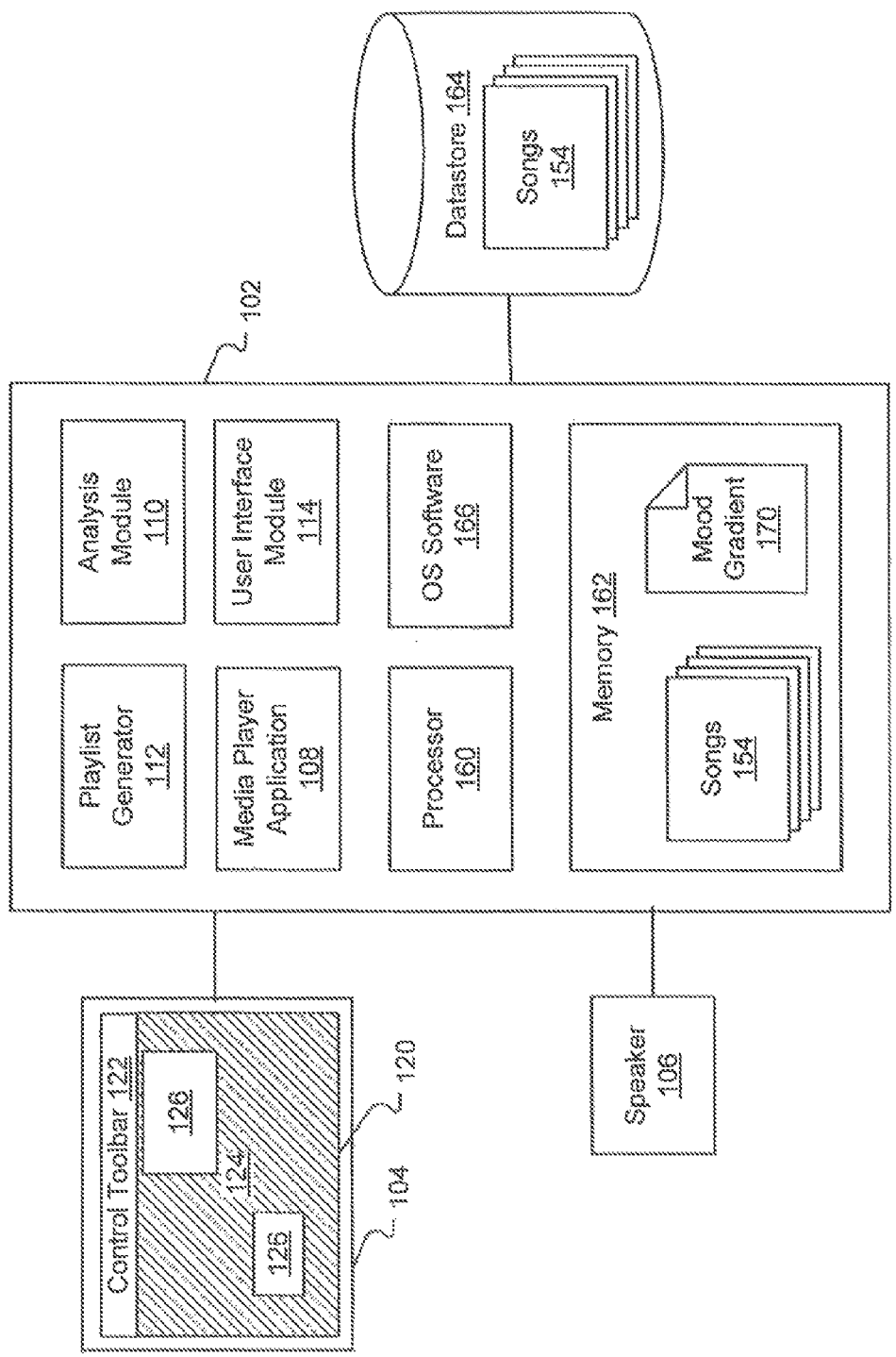
FIG. 1 illustrates a high level embodiment of a system for generating and displaying a media discovery interface to a user.

FIG. 1 illustrates a high level embodiment of a system for generating and displaying a media discovery interface to a user. In the embodiment shown, a media rendering device 102 displays the media discovery interface 120 to the user, via a display 104. The discovery interface 120 includes an area representing a three-dimensional space 124 and may also include one or more controls in one or more control areas 122, such as a toolbar as shown. The media discovery interface 120 is discussed in greater detail below.

The rendering device 102, through its display 104 and speaker 106, is capable of rendering media objects 154 to a user. As mentioned above, the media objects 154 are in the form of songs 154 that can be played by the rendering device to the user via the speaker 106. The songs 154 may be stored in memory 162 or in a remote or attached datastore 164 that may or may not be internal to the rendering device 102.

The media rendering device 102 is provided with peripherals including a display 104 and speaker 106. These peripherals may be part of the rendering device 102 or separate peripherals designed to be connected to the rendering device 102 via communication ports or other electronic connections as are known in the art. The display 104 may be an internal display built into the rendering device for displaying information to a user. Alternatively, the display may be an external display, such as a flat screen or cathode ray tube monitor. The speaker 106 may be a standard speaker built into the device or external to the device. Alternatively, the speaker 106 may be a simple set of headphones attached to the device or any other sound-generating device through which audible sounds or music may be played to the user.

In FIG. 1 the rendering device 102 is illustrated as a computing device having a processor 160 that executes software, such as the operating system software 166 and media player application 108 as shown, stored on memory 162 as is now common for many rendering devices, such as the RIO by Diamond, the IPOD NANO by Apple and the ZUNE by Microsoft. In alternative embodiments the rendering device 102 may have differing combinations of hardware and software or firmware, and furthermore may be adapted for the type of media object to be rendered. For example, in one alternative embodiment the rendering device 102 may be a purpose built piece of hardware having little or no software. In another embodiment, the rendering device may be a general purpose computing device such as a personal computer.

As discussed, the rendering device 102 illustrated further includes operating system software 166. Operating system software 166 is known in the art and examples include WINDOWS software by Microsoft Corporation, as well as Linux-based operating systems, such as that provided by Red Hat, Inc. Purpose-built operating system software 166 may also be used as different embodiments of rendering devices 102 may require more or less functionality than that encountered on a personal computer.

A rendering device 102 may include one or more of a variety of computer-readable media for storing the software, including the memory 162 and datastore 164 shown. Computer-readable media can be any available media (internal or external) that can be accessed by the device 102 and includes both volatile and nonvolatile media, and removable and non-removable media. By way of example, and not limitation, computer-readable media may comprise computer storage media and communication media. Computer storage media includes both volatile, nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by rendering device 102.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 162 includes computer storage media in the form of volatile and/or nonvolatile memory such as read only memory (ROM) and random access memory (RAM). A basic input/output system (BIOS), containing the basic routines that help to transfer information between elements within rendering device 102, such as during start-up, is typically stored in ROM. RAM typically contains data and/or program modules that are immediately accessible to and/or presently being operated on by processor 160.

In the computing device embodiment shown, the rendering device 102 is provided with a media player application 108. The application 108 is a software application or a combination of software and hardware in which the software is executed by the processor 160 in order to render the songs 154 to the user. Media player applications are known in the art and examples of media player applications include the Windows Media Player by Microsoft, Apple's iTunes player, and Yahoo!'s Media Jukebox to name only a few.

A media player application 108 as shown includes the software necessary to generate and display a user interface 120 in the form of a the media discovery interface 120 to the user via the display 104. In the embodiment shown, this is illustrated by the user interface module 114. The user interface module 114 generates the user interface 120 on the display 104 and monitors the user interface 120 for interactions from the user (e.g., mouse clicks, control or icon 126 selections, or other commands) and passes those commands (which may also be considered requests to perform an action) to processor 160 and/or media player application 108.

The user interface module 114 includes the ability to generate and manipulate the representation of the three-dimensional space 124 so that different views may be generated allowing the user to get the perspective of "flying through" the space 124. Thus, the user interface module 114 can cause the space 124 to appear to rotate and move relative to the view of the user. This manipulation of the space 124 may be in response to user commands received, such as through a set of controls (not shown) in a control toolbar 122. The interface 120 allows users to travel through a three-dimensional space which contains media objects represented as two-dimensional or three-dimensional shapes or icons 126 in that space 124.

Interfaces having three-dimensional space are well-known in the gaming industry and there are many different means for controlling the display of three-dimensional space known in the art. For example, in one embodiment a combination mouse and keyboard input scheme may be used in which the mouse is used to determine direction of view and keystrokes are used for movement forward, backward and side to side relative to the direction of view. Other methods for user control of the display of three-dimensional space 124 are known in the art and any suitable control means may be used with the interface 120 described herein.

In the embodiment shown, in addition to controlling the display of the three-dimensional space 124, the user can operate the rendering device 102 and cause songs to be rendered by the device 102, such as through the control toolbar 122 on the user interface 120. The control toolbar 122 includes one or more user selectable controls (not shown) through which requests and commands may be given to the rendering device 102. Such controls are known in the art and may include the familiar controls for PLAY, SKIP, FAST FORWARD, REWIND, PAUSE and STOP.

As described above, the user interface 120 includes an area that displays a three-dimensional space 124 to the user. Illustrated within this three-dimensional space 124, one or more icons 126 (two are shown) each representing songs 154 are displayed. The icons 126 are located within the three-dimensional space 124 based on the characteristics of the songs as determined by an objective analysis of the objective musical characteristics ("characteristics") of the songs 154.

The characteristics of each song are determined through analysis of the renderable data of media object, in this embodiment by an objective analysis of the characteristics of the renderable music data of the songs 154. Thus, objective characteristics of a song, and the values describing those characteristics, are not and should not be considered traditional metadata, which as the term metadata is used herein refers to data describing the song or media object that cannot be derived from an analysis of the renderable data of that song or object. Traditional metadata is typically such data as title, author/artist, images, text or other data that for one reason or another the creator of the media object wished to associate with the renderable media data. The characteristics of a song or media object, on the other hand, may be determined directly from an analysis of the renderable media data which allows the objective characteristics for any media object or song to be determined from that object, even in the complete absence of any metadata or other information about the object.

In the embodiment shown, the rendering device 102 is provided with an analysis module 110 for performing the analysis of the songs and identifying the characteristics used for display on the three-dimensional space 124. In an alternative embodiment, the analysis module 110 is not provided on the rendering device 102, but the necessary data describing the characteristics is either known (e.g., is stored on the computer-readable media of the rendering device 102 such as with other metadata associated with each song) or available to the rendering device 102, such as via a network from a remote datastore 164.

In an embodiment, the analysis module 110 has the ability to calculate audio content characteristics of a song such as tempo, brightness or beatedness, as described in greater detail below. Any objective audio or video characteristic may be evaluated and a representative value determined by the analysis module 110. The results of the analysis are a set of values or other data that represent the content of a media object (e.g., the music of a song) broken down into a number of characteristics. Such characteristics may include tempo, beatedness and brightness, as discussed below. Other characteristics are also possible. In the embodiment shown, at least three characteristics of each media object are analyzed. This allows each object to be represented in three-dimensional space 124 on the media discovery interface 120 of the display 104 as a location in that space. The characteristics for each song 154 may be stored locally and/or transmitted to a remote data store.

The analysis may be performed automatically either upon each detection of a new song 154 on the rendering device 102, or as each new song 154 is rendered. The user may also be able to have input into the calculation of the various characteristics analyzed by the analysis module 110. The user can check to see what tempo has been calculated automatically and manually adjust these parameters if they believe the computer has made an error. The analysis module 110 may calculate these characteristics in the background or may alert the user of the calculation in order to obtain input from the user.

In an embodiment, the analysis module 110 is software executed by the processor 160. The software may be pre-existing as part of the media player application 108 or may be obtained on an as needed basis, as described in greater with reference to the networked embodiment shown in FIG. 2. The analysis module 110 may be part of the media player application 108, or independent modules as shown in FIG. 1.

In addition, the rendering device 102 may include a playlist generator 112. In the embodiment shown, the playlist generator 112 is a software module that generates either a playlist (i.e. a list of songs which may be in a sequence in which the songs are to be played) or sequentially selects songs, on an as needed basis, for rendering to the user. The playlist generator 112 may be part of the media player application 108, or an independent module as shown in FIG. 1.

In the embodiment shown, the playlist generator 112 selects songs based on their characteristics as determined by the analysis of the music data. Given an initial song or set of values for different characteristics (referred to as the "seed"), the playlist generator 112 uses a similarity algorithm to identify one or more similar songs to the seed. The playlist generator 112 may select each song in the sequence based only on its similarity to the song before it, or may select songs relative to the seed only. The selection of similar songs based on known values for objective characteristics is known in the art and any suitable method may be used by the playlist generator 112.

The rendering device 102 illustrated also includes a mood gradient 170. The mood gradient 170 is a data structure that contains information usable by the playlist generator 112 for the selection of songs for a playlist. The mood gradient 170 contains a list of different sets of objective musical characteristics which may or may not be associated with the characteristics of a particular song. In an embodiment, each set of characteristics may include a characteristic identifier (e.g., "tempo", "brightness", or "tempo in beats per minute") associated with each value. In an alternative embodiment, additional information may be provided to allow the playlist generator 112 to fully understand what the values in the sets of the mood gradient are. Such additional information may include an identification of the method or algorithm that produced the value and/or the units (e.g., beats per minute, beats per second, etc.) for the values. This information in the mood gradient is then used to filter and order songs for a playlist. The mood gradient 170 is discussed in greater detail below.

For example, in an embodiment discussed in greater detail below, the playlist generator 112 is provided with mood gradient 170. Using this as a seed set of target values, the playlist generator selects one song for each of the song/characteristic value set listed in the mood gradient 170. The songs may be selected based on their similarity to the characteristics of each listing (i.e., each independent set of characteristics) in the mood gradient 170. In this way, the playlist generator 112 can build a new playlist based on the mood gradient 170 but that has dynamically selected songs, which can then be rendered to the user, i.e., the songs in the new playlist rendered sequentially on the speaker 106. Thus, in effect, a user can select a mood gradient 170 and be presented with a dynamically-selected set of songs in which each song has similar characteristics to the characteristics in the mood gradient 170.

The use of the mood gradient 170 allows a user to have new and different playlists generated by the rendering device 102, but such playlists will still conform to certain characteristics defined in the mood gradient 170. This feature allows a user to generate new playlists for a given mood. For example, a mood gradient 170 may be created for mellow listening and another mood gradient 170 may be created for exercising. Yet another mood gradient 170 may be created for driving through traffic, air travel or driving on long, cross-country trips. In this use, a mood gradient 170 defines sets of characteristics and an ordering that songs in a playlist should conform to.

A mood gradient 170 is illustrated as being stored in the memory 162 of the rendering device 102. A mood gradient 170 may also be stored in datastore 164 depending on the implementation of the system.

Figure 2:
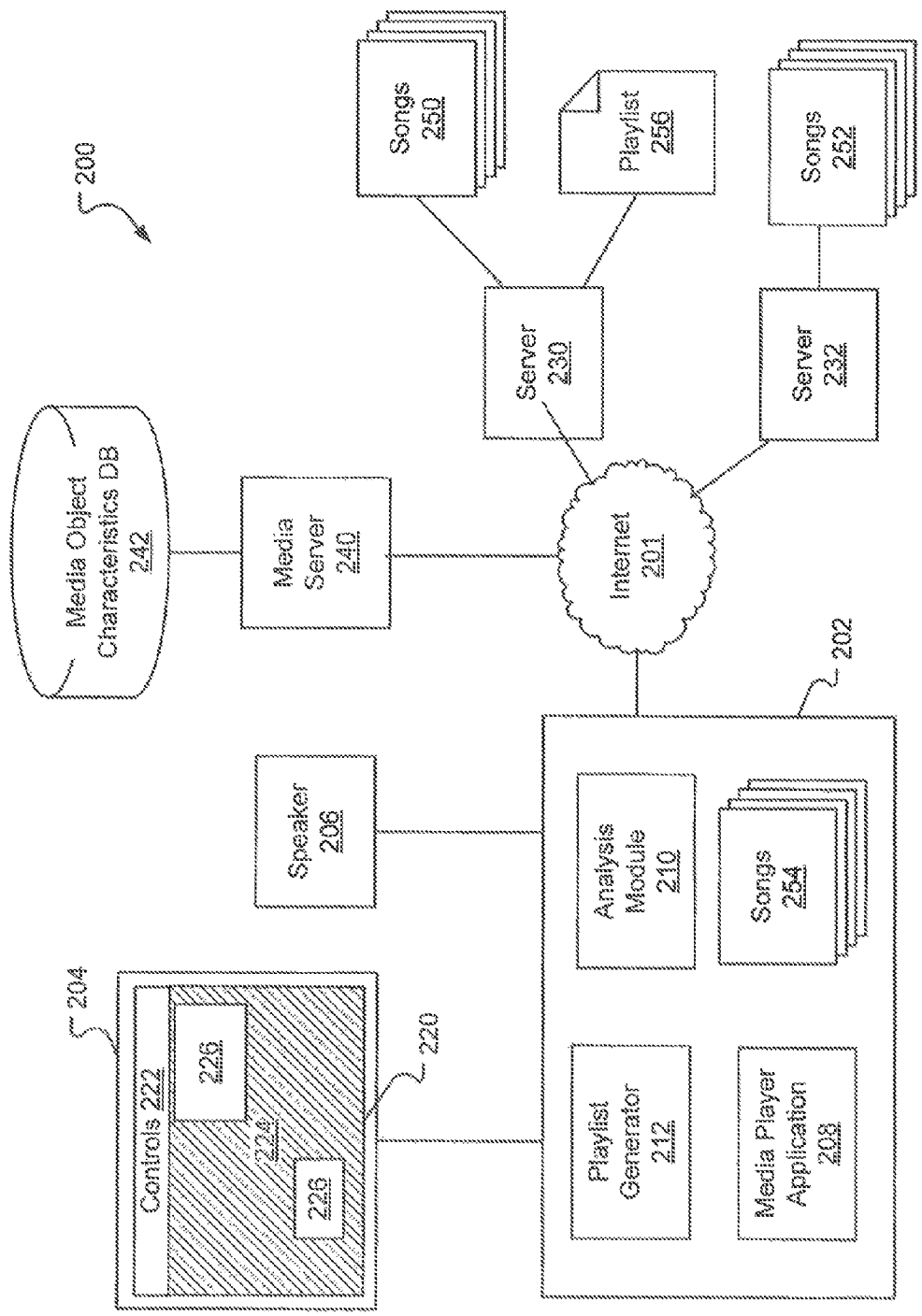
FIG. 2 illustrates another embodiment of a system for generating and displaying a media discovery interface to a user in a client-server architecture.

FIG. 2 illustrates another embodiment of a system for generating and displaying a media discovery interface to a user in a client-server architecture. In the system 200 shown, a client computing device 202, which may be a rendering device 102 as discussed above with reference to FIG. 1, is shown attached to several server computing devices 230, 232, 240 via a communication network 201. In the embodiment shown, the communication network 201 is the Internet 201, although any communication network may be used including a cellular telephone network, wi-fi network, wide area network or a local area network.

FIG. 2 illustrates several of the components of an embodiment of a client rendering device 202. The client rendering device 202 includes a media player application 208 for rendering media objects 250, 252, 254, which operates as discussed above with reference to FIG. 1. The client rendering device 202 is further illustrated as storing one or more media objects in the form of songs 254 locally on the device 202. The locally stored songs 254 are distinguished from the songs stored remotely from the client rendering device 202, i.e., the songs 250 on server 230 and songs 252 on server 232.

The client rendering device 202 is further illustrated as having an analysis module 210. The analysis module 210, as discussed with reference to FIG. 1, analyzes songs 250, 252, 254 to determine a set of values describing the characteristics of each of the songs analyzed. In the embodiment shown, these values for a song may be transmitted via the Internet 201 to a media server 240 for storage on a database 242 of media object characteristic value sets. Media object characteristic value sets may also be stored on the client rendering device 202.

The client rendering device 202 further includes a playlist generator 212 as described above with reference to FIG. 1. The client rendering device 202 is illustrated as being attached to a speaker 206 and a display 204. As described with reference to FIG. 1, the display 204 illustrates a user interface 220 to the user. This user interface includes a set 222 of controls, as well as a discovery interface area 224, which displays a three-dimensional representation of each of the songs in three-dimensional space based on their characteristics.

The system 200 illustrated includes servers 240, 230, 232 through which the client rendering device 202 may access remotely stored songs 250, 252 and playlists 256, as shown. Such songs 250, 252 may be accessed by the client rendering device 202 and rendered to the user via the speaker 206. In the embodiment shown, when songs are accessed, the analysis module 210 may generate the characteristics for each song as it is rendered. Alternatively, the analysis module 210 may retrieve previously generated characteristics from a remote location such as the song/media object characteristic database 242. Regardless of how the characteristics are obtained, the discovery interface area 224 will display an icon, shape or some other visual representation 226 of the object in the three-dimensional space 124 as described elsewhere. As songs are rendered, the interface 220 may also show a path between songs providing a visual representation through a three-dimensional characteristic space of the path of objects that have been recently rendered.

In an embodiment, song characteristics (e.g., the set of values derived from the analysis of the characteristics of the song) may be stored in a remote database 242 or locally on the client rendering device 202. In yet another embodiment, such information may be stored with some or all of songs 250, 252, 254 such as metadata for each song stored within the container file for song. Previously generated song characteristic value sets are useful, as described in greater detail below, when generating playlists from a mood gradient or when displaying in three-dimensional characteristic space songs accessible to the client rendering device 202 but that may not have been rendered previously by the user.

For example, a user may wish to investigate a library of songs available on a given server 230. Upon directing the user's client device 202 to display the songs 250 stored on the server 230, the user may be presented with the three-dimensional space 224 illustrating some or all of the songs 250 as shapes 226 in the space 224. Based on the relative proximity of the shapes 226 within the space 224, the user can identify which songs 250 are similar. The user may also be able to select particular shapes 226 to obtain more information, such as metadata describing the artist, song title, etc., in a separate pop-up window, tool tips window or on the shape 226 itself. The user may further be able to render some or all of the song by selecting the shape 226 from the interface 220.

Figure 3:
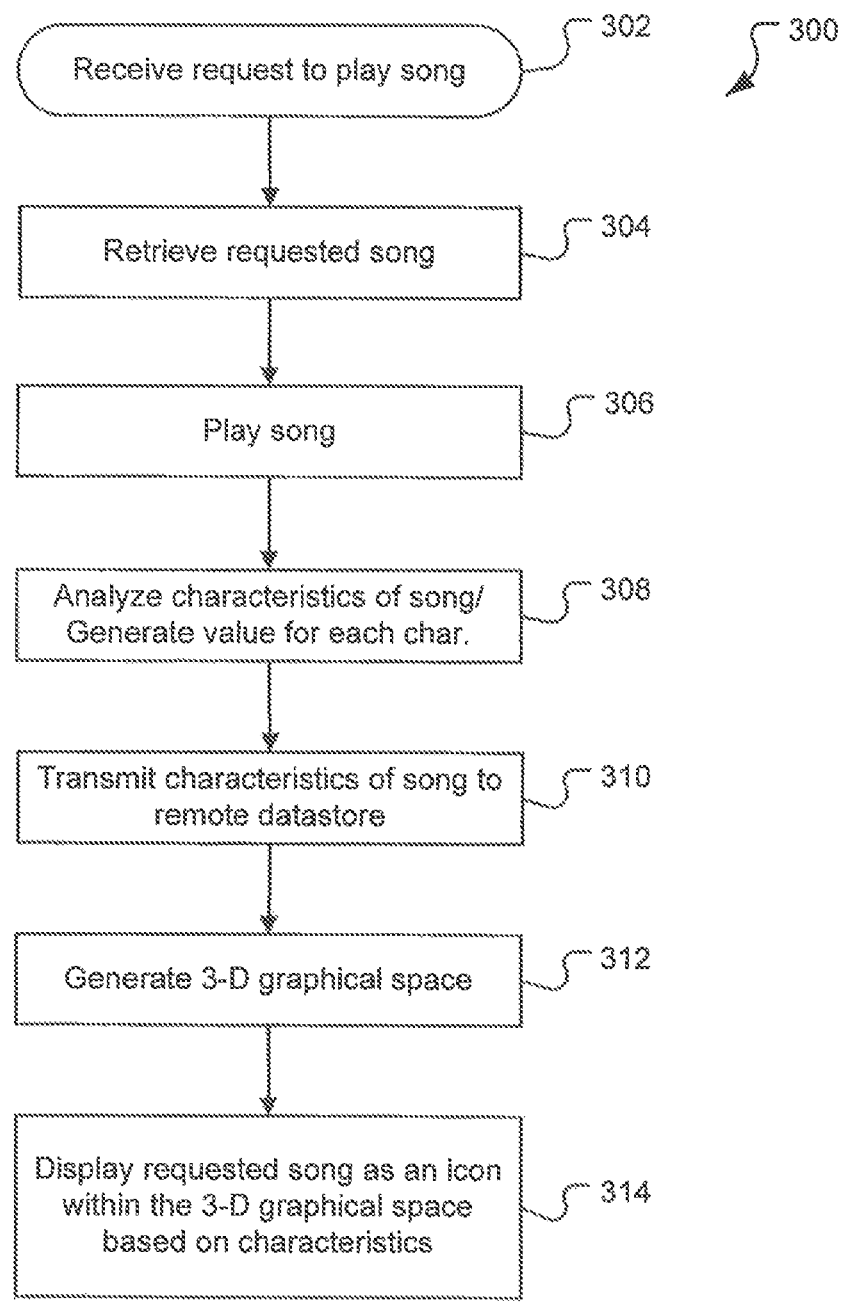
FIG. 3 illustrates an embodiment of a method for rendering a song to a user utilizing the media discovery interface.

FIG. 3 illustrates an embodiment of a method for rendering a song to a user utilizing the media discovery interface. The method begins with a receive request operation 302. In the receive request operation 302, a user has made a request or entered a command to play a song and that request has been received by the rendering device. The request may be made by the user selecting an icon, text string or shape associated with a song through a graphical user interface (e.g., double-clicking the title of the song) or issuing some command through the interface to play the song. Alternatively, the user may have clicked on a link, causing the rendering device to attempt to retrieve the song associated with the link using the address information contained therein. Regardless of how the request is initiated, it is received in the receive request operation 302.

In response to receiving the request, the rendering device retrieves the requested song in a retrieve song operation 304. This may require the song to be accessed in local memory or retrieved from a remote storage device based on information contained in the request.

In the embodiment shown, after being retrieved the song is played in a render operation 306. The render operation 306 may include decompressing the data of the song and converting it into some format, and then passing the information necessary to the speaker or other sound generation device in order to have the audio generated to the user.

In addition, method 300 includes an analysis operation 308 in which the song is analyzed to determine the characteristics of the song. In the embodiment shown, a value is generated for each of a set of selected characteristics that describes that characteristic. Such characteristics may be things such as tempo, beatedness, brightness, and other audio features that can be analyzed mathematically based on the data within the song.

In the analysis operation 308, audio content analysis using digital signal processing techniques may be used to infer definitive musical characteristics such as tempo, "beatedness" and brightness. These characteristics are then used to classify media, allowing songs which would otherwise have no metadata to be classified and displayed to a user via the media discovery interface. As described above, the analysis may be performed on a client or a server and thus the analysis may be distributed throughout a network and need not be performed at the time of display, as long as the values of the characteristics are available to the displaying device. For example, the analysis operation 308 may be performed on individual client machines as the user is consuming the media via a web based media player.

The analysis operation 308 may use any and all types of audio content features known including compound features such as tempo or beatedness, lower level acoustic properties such as spectral centroid, spectral rolloff, spectral flux, zero crossings and also mel-frequency cepstral coefficient (MFCC) features in order to classify media which would otherwise have no metadata. For example, in an embodiment three characteristics may be analyzed to obtains a set of values describing each song—tempo, beatedness and brightness. An example of a software system and method for calculating characteristics for songs can be found in the reference Tzanetakis et al. "MARSYAS: A Framework for Audio Analysis" Organized Sound (1999), 4: 169-175 Cambridge University Press, which is hereby incorporated herein by reference.

Tempo represents the speed or pace of a piece of music. It is a useful descriptor and has an immediate and direct influence on the mood or atmosphere created by a piece of music. Tempo is one of the more common attributes used for classifying music.

Beatedness represents the strength of the beat in the audio signal and brightness is a measure of the overall timbre. Beatedness has a strong impact upon the perceived tempo and the corresponding mood of a track. The stronger the beatedness, the more energy it tends to convey, with users often believing a track with more beatedness is actually "faster" than a less beat oriented track with the identical tempo. Beatedness may also be used as an indicator of whether a video has a musical soundtrack (e.g. a music video) or not, or whether an audio file is a podcast with mostly speaking or a music track. Depending on the implementation, tempo may be used as the dominant characteristic, followed to a lesser degree by beatedness and finally brightness which can be used to fine tune the result space.

For renderable music data, many objective characteristics, which may sometimes also be referred to as features, are known in the art (for example, see E. Scheirer & M. Slaney, *Construction And Evaluation Of A Robust Multifeature Speech/music Discriminator*, Proc. ICASSP-97, Munich (1997) which reference is hereby incorporated herein by reference) and any characteristics or set of characteristics may be used herein. Examples of other characteristics which may also be used include:

Spectral Centroid: The center-of-gravity of the magnitude spectrum—A measure of the brightness of the sound.

Spectral Rolloff: The frequency in the magnitude spectrogram for which 85% of the energy falls below. This is another measure of the timbre of the sound.

Spectral Flux: The amount of change in the spectrum between frames. This is computed by squaring the difference between successive spectrogram frames.

Zero Crossings: The number of sign changes in the acoustic waveform over a window. This is a measure of the dominant frequency in the signal.

For each of these four basic characteristics, four different statistics may be calculated. They are as follows:

The mean of the mean: Calculate the mean over 40 frames, and then calculate the mean of this statistics. This is equivalent to a single calculation of the mean over the entire 30 seconds.

The mean of the standard deviation: Calculate the standard deviation of the audio feature over 40 frames, and then calculate the mean of these standard deviations over the entire 30 seconds. This reflects how the music changes over small windows of time.

The standard deviation of the mean: Calculate the mean of the feature over 40 frames, and then calculate the standard deviation of the feature. The 40-frame window size gives a reliable measure of the feature over a short window, which can then be compared to other windows to understand how it changes over time.

The standard deviation of the standard deviation: Calculate the standard deviation of the feature over 40 frames, and then calculate the standard deviation of this measure over the seconds.

In addition there are many characteristics that measure the rhythmic content of the music using a beat histogram calculated by measuring the temporal correlation of the energy in the signal over windows of up to 1.5 seconds. The first two peaks are identified in this beat histogram and their properties are captured as features. The rhythmic characteristics include:

High Peak Amplitude: the size of the biggest peak in the beat histogram.

High Peak Beats-per-minute: the speed of the primary (or loudest) beat.

Low Peak Amplitude: the size of the second-biggest peak in the peak histogram.

Low Peak Beats-per-minute: the speed of the second-loudest beat.

Peak Ratio: Ratio of the amplitude of the second peak to the amplitude of the first.

Three features based on energy measures.

The above is just one list of exemplary characteristics that may be analyzed in order to classify a song. Other characteristics are also possible. In addition, many other characteristics that are related to video or other aspects of content may be used when analyzing different types of media objects, such as media objects containing video.

As described above, in an alternative embodiment the analysis operation 308 may occur independently of the rendering operation 306. For example, whenever a device is alerted to a new media object or song, the analysis module may analyze the song and transmit the characteristics to a datastore for storage. In this way, each device may become a retrieval mechanism that helps populate a central remote datastore with value sets for songs. In this embodiment, the analysis need be performed only once and for all subsequent instances in which the song's characteristics are needed the system retrieves them from the datastore.

After the analysis operation 308, a transmission operation 310 transmits the characteristics determined by the analysis operation to one or more datastores. In the method 300 shown, a system such as that shown in FIG. 2 is provided and the transmission operation 310 transmits the characteristics of the song to the remote datastore 242 of a server. This information can then be retrieved and further analyzed at a later time by other client devices.

The method 300 also includes generating the three-dimensional graphical space in the user interface in a generate interface operation 312. In the generate interface operation 312, in addition to controls and other means for interacting with the media player and/or the rendering device, the representation in a three-dimensional space is created and displayed to the user.

After the three-dimensional space has been generated, it is populated in a display icons operation 314. In this operation 314, the characteristics of the songs to be displayed (which may be all of the songs known to the device or some subset of songs) are identified and, for each of the songs to be displayed in the interface, an icon is generated.

The icon, which may be a simple three-dimensional object or some more elaborate object such as a representation of a vinyl record cover floating in space at various angles is placed in a location within the three-dimensional space depending on the characteristics calculated for the associated song. Thus, some icons will appear farther away or closer depending on the relative characteristics of each song. Furthermore, songs with similar characteristics will appear grouped together or in close proximity relative to songs with less or more characteristics.

The icons generated as part of the display icon operation 314 may include images or artwork associated with each of the songs for each of the icons. For example, in an embodiment already mentioned above, each icon may be a three-dimensional image or a three-dimensional representation of an album with the original album art floating in space at some angle where the center of the album is located at the point that corresponds to the characteristics of that album.

As part of the display icons operation 314, a determination is made as to what songs will be displayed and data for those songs is retrieved in order for the icons for those songs to be located in the appropriate place within the three-dimensional space. This may include retrieving characteristics already generated by the rendering device or retrieving characteristics previously generated by a different device and stored either on the rendering device or on a remote web server.

The method 300 may be repeated each time a song is played by a user. For example, a user may select a playlist, thus generating a series of receive request operations 302 as the rendering device plays each song in turn, each song of the playlist being considered a separate request, each song being analyzed in an analysis operation, and the characteristics subsequently transmitted in a transmission operation 310 to the remote data store. The analysis operation 308 and transmission operation 310 may be performed at the time the song is played. Alternatively, the operations may be performed at the time the playlist request is received. Thus, for example, all of the songs on the playlist may be presented in the three-dimensional graphical space substantially immediately after receiving the command to play the playlist, if the rendering device is fast enough to analyze all of the songs or can retrieve the characteristics of all of the songs quickly. Thus, each song will be displayed in the three-dimensional graphical space.

The method 300 may also be used to display similar songs to the user. In this embodiment, as the method 300 is performed, the display icons operation 314 may include retrieving characteristics of a plurality of songs and displaying all of the songs as icons in the three-dimensional space. Thus, the user is made aware and able to select any of the icons to either instantly play another song, to select a next song, or to select the selected song as the next song to play after playing the current song.

The songs displayed in the display icons operation 314 may be locally stored songs or songs accessible from a remote source such as a media server. In this embodiment, the display icons operation 314 may include retrieving one or more sets of values of songs that are not locally stored or values of songs that are locally stored but in which the songs themselves reside on a remote data store.

The display icons operation 314 as mentioned above may include retrieving an image associated with each song such as album cover art. In addition, it may include retrieving differently shaped icons to represent different pieces of information to the user. For example, an icon may be represented as a sphere if it represents a song in a specific genre such as jazz, and may be represented as a cube if it is for a song in another genre such as classical.

In addition, the display operation 314 may include a filtering operation in which only songs of a certain genre having a certain average user rating or higher, or other criteria, may be used to screen the songs that are to be displayed on the display generated in the generate interface operation 312. If more than one song is played, or if a playlist has been selected, a path between songs may be illustrated in the interface, such as the one shown in FIG. 4B. This may be performed in a display path operation (not shown) in which, after the icons have been populated into the three-dimensional interface, a path of some kind is drawn between objects, such as between the songs of the playlist.

The interface itself may be redrawn in response to user commands or as different songs are played so that the current song is at a specified point within the three-dimensional graphical space. Alternatively, the songs could be colored or shown to be blinking or given some other type of emphasis as its corresponding song is playing to indicate that it is the song that is currently playing. Thus, for each icon illustrated in the three-dimensional space, there may be a plurality of different icons, one with emphasis, one with without, one showing the icon as being the next to play, or one showing the icon as having played in the past. Thus, each icon may, in fact, be a set of icons for use in different situations.

For example, in a first embodiment, the display icons operation 314 may center the three-dimensional space on a first icon while the first song is playing. As a next song is playing, a path may be drawn from the first icon to the second icon, and the interface redrawn to illustrate movement from the first to the second icon in centering the three-dimensional space on the second icon. The view as shown with the other objects may be modified as well to view from a different angle so that the full path may always be displayed to the user, allowing the user to see all of the songs on the playlist represented by the path.

As mentioned above, in the generate interface operation 312, a three-dimensional space is generated having axes corresponding to three previously selected characteristics. e.g., tempo, beatedness and brightness. Each characteristic of the displayed characteristics may be user-selectable. For example, a user may, through the interface, select from a set of objective characteristics to be displayed as dimensions within the interface. This selection may be received in a receive user selection operation (not shown) which may occur at any time during or before the method 300 to allow the user to set up the interface in response to the user's preferences. This information is then used when generating the three-dimensional space in the interface. In addition, the user may select such things as scale, thus making objects closer together or farther away for a given characteristic. In addition, the XYZ coordinates may be dictated so that the user can have a specified characteristic in a specific dimension.

The space that the user finds themselves navigating within is the acoustic similarity space associated with the seed song based upon the set of acoustic features or characteristics used for parameters x, y and z. If the user navigates beyond a threshold, for example 20% away from the seed song, then the space will be recalculated based upon the nearest song. The user may also choose to alter the dimensions which make up the space they are in as an alternative navigation mechanism. For example, they could choose to switch the X dimension from tempo to spectral rolloff or zerocrossing. At this point a new space would be calculated and redrawn based upon the nearest media object as the seed track and the new X, Y and Z acoustic feature parameters.

Figure 4A:
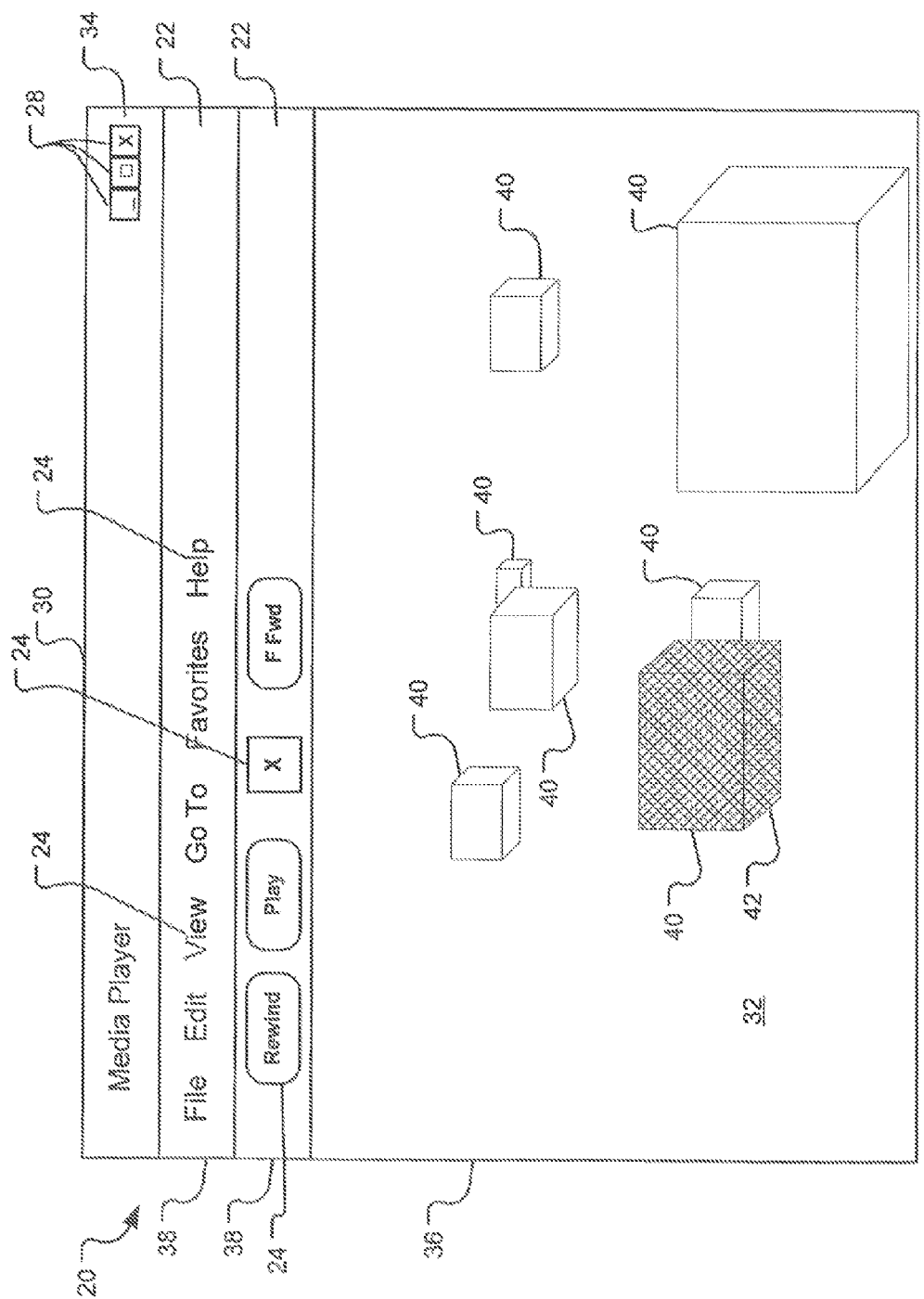
FIG. 4A illustrates an embodiment of a graphical user interface showing the three-dimensional graphical space.

FIG. 4A illustrates an embodiment of a graphical user interface showing the three-dimensional graphical space. FIG. 4A illustrates an embodiment of a graphical user interface 20 having a plurality of windows, each providing various functionality to the user, including an embodiment of a three-dimensional space as described herein. In an embodiment, the interface may be generated by a media player application or by a browser accessing a web page with an embedded media player application.

The user interface 20 may include a first parent window 30 that typically defines the general size, color, and layout of the interface and includes window control buttons 28 (e.g., minimize, close, etc.) for that window 30. The interface 20 may also comprise a second parent window 36 (a child to the first parent window) within the first parent window 30, and one or more child windows 38 dependent from the second parent window 36. The second parent window 36 and child windows 38 typically define information and/or functionality that will assist a user when accessing and navigating the features of the player.

For example, the second parent window 36 and its child windows 38 may provide toolbars, pull-down menus, Plug-ins, applications, etc. For example, two child windows 38 provided at the top (in the drawing) of the interface 20 define two toolbars 22, which may include a variety of interface controls 24 such as, for example, pull-down menus, functional buttons (e.g., stop, back, forward, home, etc.), and a combination of functional buttons and windows (e.g., a search button and window). The uppermost toolbar 22 provides a plurality of pull-down menus 24 and the lower toolbar 22 provides a plurality of functional buttons 24. In an embodiment, the user may toggle any of the (in the drawing) toolbars 22 on and off using a View toolbar control (pull-down menu) provided in the upper toolbar 22.

A content window 32 is also provided as part of the interface 20 within which three-dimensional space is displayed. The three-dimensional space is illustrated in the lower window 32 of the interface 20. In this area, the three-dimensional graphical space is essentially represented by an empty space populated with a number of icons; in this case, in the form of rectangular prisms shown in three dimensions in a perspective view. The prisms have a different size and orientation in the embodiment shown, in order to give the user visual cues concerning their relative spacing in the three-dimensional space. For example, the size is used to illustrate how near or far away they are in the three-dimensional space relative to the user's viewpoint. Thus, smaller icons 40 illustrate that the song is farther away, in terms of its characteristics, from the viewer than a larger icon 40. Although not shown, other items may be included in the three-dimensional space, such as visual axes, scales and background, in order to provide the user with more context of the three dimensions of the space.

In the embodiment shown, in FIG. 4A, one of the icons 40 is displayed with a different fill pattern than the other icons 40. This icon 42 is used to illustrate that the song corresponding to the icon 42 is currently being rendered. In addition to shapes, icons 40 may have artwork, as discussed above, such as album cover art, text or other information displayed on the surface of the icon. For example, icons may be illustrated by spheres covered with the album art or may be illustrated by cubes of text or cubes of photos of the artist and/or name of the album.

In an embodiment, users are able to navigate through the space shown in the content window 32 using the directional keys of their keyboard or simply by moving their mouse forward and back or left and right. They can pivot in the space by holding down the Ctrl key or mouse wheel and sliding the mouse left or right. Different types of media (for example audio or video) can be represented by differently shaped icons 40. Any available album art may be projected onto the icon 40 and any available metadata appears when the user rolls over the shape with their mouse. In an embodiment, each icon 40 is also a user selectable control such that, when the user clicks on the icon 40, the song is launched (for example in a separate media player) and rendered. The three-dimensional space may then be recalculated with the location of the selected icon 40 as its centroid. Additional song characteristics (or metadata) can be represented using the size and color of the shapes which represent songs in this space.

The icons 40 generated on the user interface may also be referred to as controls. The icons 40 may be user-selectable in order to cause the song associated with a selected icon 40 to be rendered to the user. The user may select the icon 40 by means of a pointing device such as a mouse and by clicking or double-clicking upon an icon 40. Alternatively, an icon 40 may be selected through user inputs in a touchpad or arrow pad, allowing the user to select different icons 40 and issue commands causing the songs associated with those icons 40 to be rendered by the rendering device.

Figure 4B:
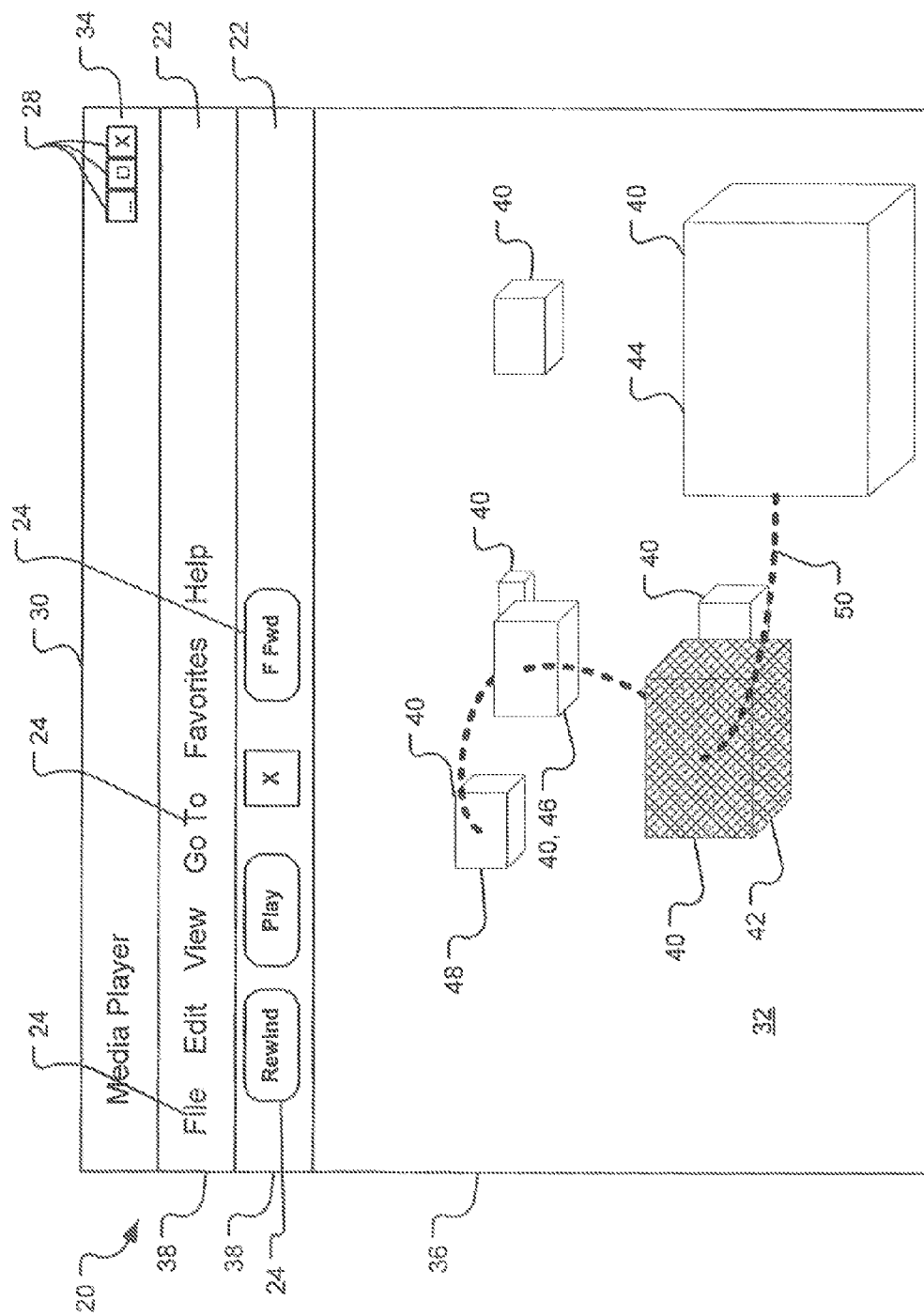
FIG. 4B illustrates another aspect showing an embodiment in which a path is displayed on the interface.

FIG. 4B illustrates another aspect showing an embodiment in which a playlist or mood gradient as discussed later, is displayed on the interface. In addition to the icons 40 and the currently rendered icon 42, a path 50 is illustrated between four icons in this example. The path 50 begins at a first icon 44, travels through the currently rendered icon 42, to a second icon 46 and yet another icon 48. In the embodiment shown, the path 50 is illustrated by a dashed black line 50. Any means of illustrating the path 50 may be used from a dashed line to a solid line to a straight line to lines with a smooth curve (such as shown) to some other effect illustrating the songs as being linked in sequence. As discussed above, the view of the three-dimensional space may be altered by the system so that all points on the path 50 are initially displayed to the user until such time as the user takes control of the display and causes the view to change.

Figure 5:
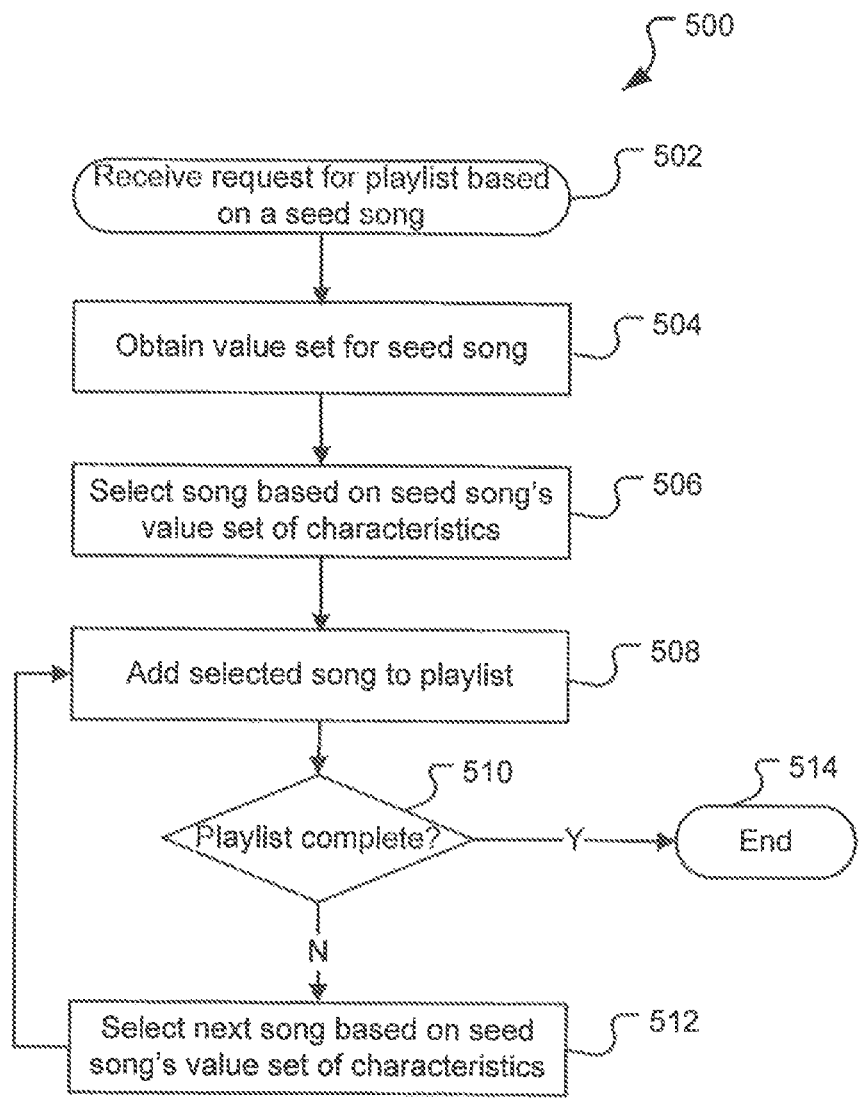
FIG. 5 illustrates an embodiment of a simple method for generating a playlist based on a seed song.

FIG. 5 illustrates an embodiment of a method for generating a playlist based on a seed song. In the method 500, a request is received for a playlist based on a seed song in a receive request operation 502. The request may be a request for a playlist, i.e., a list of songs in a sequence. Alternatively, it may be a request for a rendering device to render a series of songs starting from the seed song or a song similar to the seed song until a cease command is given by the user. What is ultimately generated by the method 500 will be dictated on what the request is for, i.e., a simple list in text, a group of songs, or songs to be rendered in series to the user.

After the request is received, the values for the characteristics of the seed song are obtained in an obtain by a set operation 504. This may require that the seed song be evaluated by the rendering device in order to obtain the value set describing the song's characteristics. Alternatively, the value set of the characteristics of the seed song may be retrieved from a local or remote storage based on identification information of the seed song included in the request.

Regardless of how the value set is obtained, a song is then selected based on the seed song's value set of characteristics in a selection operation 506. Such a selection may be a simple ranking to identify songs with the closest value set to that of the seed song. Alternatively, filtering may also be done in order to filter out some of the potential songs that may be selected, i.e., filtering out or in specific genres, or songs by specific artists. More complicated selection algorithms may also be used: algorithms based on weighting each of the different characteristics differently, algorithms based on past user selections, and algorithms based on known user tastes.

Regardless of how the selection is performed, after the first selection operation 506, a selected song is added to the playlist in an add song operation 508. Next, a determination operation 510 determines if the playlist is complete (e.g., the playlist has the requested number of songs in it, etc.). For example, if only one song is required, i.e., the request is for a song similar to the seed song, then the playlist is complete and the method 500 terminates as shown.

The determination operation 510 includes returning to the requestor the information in the format required. This may include transmitting the song to the rendering device or playing the song on the rendering device. In addition, or alternatively, it may include transmitting text or displaying text to the user identifying the selected song. In yet another embodiment, it may include transmitting a playlist to the user, the playlist containing information necessary for the rendering device to access the song or songs of the playlist at a later time.

If the playlist is determined not to be complete by the determination operation 510, then a select next song operation 512 is performed. In the select next song operation 512, the next song is selected based on either the seed song's value set or based on the value set of characteristics for the previously selected song. The method of selection may be determined by default or by a user command contained in the request or set prior to submitting the request. Thus, the user may request a playlist of songs in which every song is similar to the seed song. Alternatively, the user may also request a playlist of songs in which each song is similar to the song before it but not necessarily similar to the seed song, thus allowing the nature of the songs in the playlist to evolve over time.

After the select next song operation 512, the selected song is added to the playlist in the addition operation 508 and the determination operation 510 is repeated again. In this way, a playlist may be built until a playlist of the appropriate size is generated. In an embodiment, the determination operation 510 may not be an operation that looks for a specific number of songs, but rather repeats until the user issues a cessation command. In this way, the method 500 can be used to generate a sequence of songs that can be rendered to the user one after the next until the user issues a command to stop rendering songs.

For example, in an embodiment a request is received for a playlist of 100 media objects which are "similar" to a seed track. Similarity is calculated by finding the seed track's nearest neighbors in the chosen acoustic feature set. The results are returned in the form of an XML document.

The following are examples of documents that could be part of a system for generating a playlist from a mood gradient. Document 1 is a playlist corresponding to a particular set of songs. The set may be all the songs in a library, all the songs available to the system for rendering, or a subset of songs that the user identified to be used when generating playlists. Document 2 is a mood gradient and Document 3 is a playlist document generated by applying the mood gradient to the characteristic value sets of the songs contained in Document 1. The songs in the Document 3 are selected from the set of songs identified in Document 1. The example documents are written in XML but any language or data format may be used as long as the rendering device and interface can interpret the information contained therein. The mood gradient and generated playlist are based upon three characteristics identified as x, y, and z, which for example, could be the acoustic features tempo, brightness and "beatedness".

---

Document 1) Playlist of Songs Available

```
<?xml version="1.0" encoding="UTF-8"?>
<playlist version="1" xmlns="http://xspf.org/ns/0/">
    <title>music from scissorkick.com and aurgasm.us</title>
    <creator>Yahoo! Playthispage</creator>
    <trackList>
        <track>
            <location>http://aurgasm.us/music/julija/Petra%20Jean%20Phillipson%20-%20Play%20Play.mp3</location>
            <title>Petra Jean Phillipson - Play Play</title>
        </track>
        <track>
```

| Document 1) Playlist of Songs Available |
|---|

```
        <location>http://aurgasm.us/music/julija/Petra%20Jean%20Phillipson%20-
%20I%20Want%20The%20Impossible.mp3</location>
        <title>Petra Jean Phillipson - I Want The Impossible</title>
    </track>
    <track>
        <location>http://aurgasm.us/music/julija/Federico%20Aubele%20-
%20Ante%20Tus%20Ojos.mp3</location>
        <title>Federico Aubele - Ante Tus Ojos</title>
    </track>
    <track>
        <location>http://aurgasm.us/music/julija/Federico%20Aubele%20-
%20En%20El%20Desierto.mp3</location>
        <title>Federico Aubele - En El Desierto</title>
    </track>
    <track>
        <location>http://aurgasm.us/music/julija/Tony%20Allen%20-%20Crazy%20Afrobeat.mp3</location>
        <title>Tony Allen - Crazy Afrobeat</title>
    </track>
    <track>
        <location>http://aurgasm.us/music/julija/Tony%20Allen%20-%20Every%20Season.mp3</location>
        <title>Tony Allen - Every Season (feat</title>
    </track>
    <track>
        <location>http://aurgasm.us/music/Silent%20Land%20Time%20Machine%20-
%20The%20Thing%20This%20Doesnt%20Mean%20Is%20Nothing.mp3</location>
        <title>Silent Land Time Machine - The Thing This Doesn't Mean Is Nothing</title>
    </track>
    <track>
        <location>http://aurgasm.us/music/Silent%20Land%20Time%20Machine%20-
%20Everything%20Goes%20To%20Shit.mp3</location>
        <title>Silent Land Time Machine - Everything Goes To Shit</title>
    </track>
    <track>
        <location>http://aurgasm.us/music/Priscilla%20Ahn%20-%20Dream.mp3</location>
        <title>Priscilla Ahn - Dream</title>
    </track>
    <track>
        <location>http://aurgasm.us/music/Priscilla%20Ahn%20-%20Lullaby.mp3</location>
        <title>Priscilla Ahn - Lullaby</title>
    </track>
    <track>
        <location>http://pharrellfluokids.free.fr/Hafdis%20Huld%20-%20Younger%20longer.mp3</location>
        <title>Younger Longer</title>
    </track>
    <track>
        <location>http://aurgasm.us/music/julija/Hafdis%20Huld%20-%20Tomoko.mp3</location>
        <title>Hafdis Huld - Tomoko</title>
    </track>
    <track>
        <location>http://aurgasm.us/music/julija/Hafdis%20Huld%20-
%20Diamonds%20On%20My%20Belly.mp3</location>
        <title>Hafdis Huld - Diamonds On My Belly</title>
    </track>
    <track>
        <location>http://aurgasm.us/music/Marsen%20Jules%20-%20Coeur%20Saignant.mp3</location>
        <title>Marsen Jules - Coeur Saignant</title>
    </track>
    <track>
        <location>http://www.scissorkick.com/blog/music/02%20Clocks.mp3</location>
        <title>02 Clocks</title>
    </track>
    <track>
        <location>http://www.scissorkick.com/blog/music/cinematic_asthestarsfall.mp3</location>
        <title>cinematic asthestarsfall</title>
    </track>
    <track>
        <location>http://www.scissorkick.com/blog/music/01%20Sneaky%20Red.mp3</location>
        <title>01 Sneaky Red</title>
    </track>
    <track>
        <location>http://www.scissorkick.com/blog/music/Nostalgia.mp3</location>
        <title>Nostalgia</title>
    </track>
    <track>
        <location>http://www.scissorkick.com/blog/music/Maserati_synchronicity.mp3</location>
        <title>Maserati synchronicity</title>
    </track>
```

Document 1) Playlist of Songs Available

```
    <track>
        <location>http://www.scissorkick.com/blog/music/ben_sideways_cerebus.mp3</location>
        <title>ben sideways cerebus</title>
    </track>
    <track>
        <location>http://www.scissorkick.com/blog/music/ben_selectiveperiphera.mp3</location>
        <title>ben selectiveperiphera</title>
    </track>
    <track>
        <location>http://www.scissorkick.com/blog/music/02%20Beats%20Mistake.mp3</location>
        <title>02 Beats Mistake</title>
    </track>
    <track>
        <location>http://www.scissorkick.com/blog/music/dragons_your_way_too.mp3</location>
        <title>dragons your way too</title>
    </track>
    <track>
        <location>http://www.scissorkick.com/blog/music/Ticklah_TwoFace.mp3</location>
        <title>Ticklah TwoFace</title>
    </track>
    <track>
        <location>http://www.scissorkick.com/blog/music/People_Staying_Awake.mp3</location>
        <title>People Staying Awake</title>
    </track>
    </trackList>
</playlist>
```

Document 2) Example Mood Gradient

```
<?xml version="1.0" encoding="UTF-8"?>
<moodgradient version="1"
xmlns="http://research.yahoo.com/moodgradient/ns/0/">
    <title>My Sample Gradient - Always gets me through the day.</title>
    <author>William White</author>
    <created>2007-08-22T06:33:11Z</created>
    <characteristics>
        <characteristic dimension="x">Tempo</characteristic>
        <characteristic dimension="y">Brightness</characteristic>
        <characteristic dimension="z">Beatedness</characteristic>
    </characteristics>
    <sequence>
        <set>
            <value dimension="x">0.0</value>
            <value dimension="y">0.0</value>
            <value dimension="z">0.0</value>
        </set>
        <set>
            <value dimension="x">0.0154</value>
            <value dimension="y">0.0124</value>
            <value dimension="z">0.0546</value>
        </set>
        <set>
            <value dimension="x">0.021</value>
            <value dimension="y">0.123</value>
            <value dimension="z">0.084</value>
        </set>
        <set>
            <value dimension="x">-0.05</value>
            <value dimension="y">0.45</value>
            <value dimension="z">0.033</value>
        </set>
        <set>
            <value dimension="x">-0.235</value>
            <value dimension="y">0.45</value>
            <value dimension="z">0.121</value>
        </set>
        <set>
            <value dimension="x">-0.152</value>
            <value dimension="y">0.332</value>
            <value dimension="z">0.242</value>
        </set>
        <set>
            <value dimension="x">0.35</value>
            <value dimension="y">0.133</value>
            <value dimension="z">0.343</value>
        </set>
        <set>
            <value dimension="x">0.1222</value>
            <value dimension="y">-0.1541</value>
            <value dimension="z">0.021</value>
        </set>
    </sequence>
</moodgradient>
```

Document 3) Example of Playlist Generated from Mood Gradient

```
<?xml version="1.0" encoding="UTF-8"?>
<playlist version="1" xmlns="http://xspf.org/ns/0/"
xmlns:fs="http://research.yahoo.com/featurespace/0">
    <title>scissorkick.com and aurgasm.us after application of mood gradient</title>
    <creator>William White</creator>
    <date>2007-08-26T09:43:12Z</date>
    <fs:x>Tempo</fs:x>
    <fs:y>Brightness</fs:y>
    <fs:z>Beatedness</fs:z>
    <fs:size>Ratings</fs:size>
    <trackList>
```

-continued

Document 3) Example of Playlist Generated from Mood Gradient

```
        <track>
            <location>http://aurgasm.us/music/julija/Petra%20Jean%20Phillipson%20-
%20Play%20Play.mp3</location>
            <title>Petra Jean Phillipson - Play Play</title>
            <image>http://images.amazon.com/images/P/23123423.jpg</image>
            <fs:point x="0" y="0" z="0" size="0.33" />
        </track>
        <track>
            <location>http://aurgasm.us/music/Priscilla%20Ahn%20-%20Lullaby.mp3</location>
            <title>Priscilla Ahn - Lullaby</title>
            <image>http://images.amazon.com/images/P/B0002Y0HXY.01._SCTHUMBZZZ_.jpg</image>
            <fs:point x="0.015" y="011" z="0.04" size="0.93" />
        </track>
        <track>
            <location>http://www.scissorkick.com/blog/music/01%20Sneaky%20Red.mp3</location>
            <title>01 Sneaky Red</title>
            <image>http://www.scissorkick.com/wordpress/wp-
content/plugins/podpress/images/sneakyred.jpg</image>
            <fs:point x="0.02" y="0.1" z="0.1" size="0.5" />
        </track>
        <track>
            <location>http://www.scissorkick.com/blog/music/cinematic_asthestarsfall.mp3</location>
            <title>cinematic as the stars fall</title>
            <image>http://www.scissorkick.com/wordpress/wp-
content/plugins/podpress/images/audio_mp3_button.png</image>
            <fs:point x="-0.02" y="0.4" z="0.03" size="0.32" />
        </track>
        <track>
            <location>http://aurgasm.us/music/julija/Tony%20Allen%20-%20Every%20Season.mp3</location>
            <title>Tony Allen - Every Season (feat</title>
            <image>http://ec1.images-amazon.com/images/P/432948023342_.jpg</image>
            <fs:point x="-0.25" y="0.42" z="0.23" size="0.64" />
        </track>
        <track>
            <location>http://aurgasm.us/music/Marsen%20Jules%20-%20Coeur%20Saignant.mp3</location>
            <title>Marsen Jules - Coeur Saignant</title>
            <image>http://ec1.images-amazon.com/images/P/4329480230232_.jpg</image>
            <fs:point x="-0.15" y="0.32" z="0.24" size="0.63" />
        </track>
        <track>
            <location>http://aurgasm.us/music/julija/Federico%20Aubele%20-
%20Ante%20Tus%20Ojos.mp3</location>
            <title>Federico Aubele - Ante Tus Ojos</title>
            <image>http://ec1.images-amazon.com/images/P/43294802304_.jpg</image>
            <fs:point x="0.25" y="0.22" z="0.33" size="0.44" />
        </track>
        <track>
            <location>http://www.scissorkick.com/blog/music/02%20Clocks.mp3</location>
            <title>02 Clocks</title>
            <image>http://ec1.images-amazon.com/images/P/43294802304_.jpg</image>
            <fs:point x="0.15" y="-0.02" z="0.13" size="0.55" />
        </track>
    </trackList>
</playlist>
```

Note the example of the generated playlist also has the additional attribute "size" which, in the embodiment shown, corresponds to the user ratings of the song. The size parameter is not used in similarity calculation but can be used to convey additional information to the user, along with the color of the shape in the three-dimensional space. All of the values for x, y, z, and size are normalized and will return a number between −1.0 and 1.0 with the seed song assigned as the centroid. In the above example x denotes tempo, y denotes brightness, z denotes beatedness and size represents the number of ratings the media object has received. These associations can be changed so that x, y, z can represent any acoustic feature and size can represent any piece of numeric metadata information available in the media object database. Because the playlist embodiment shown above includes the characteristics (i.e., the x, y, z values) for each song in the playlist, the system has the information necessary to easily map each song to a location in three-dimensional x, y, z space and need not go through an additional step of retrieving characteristics for the songs in the playlist.

Figure 6:
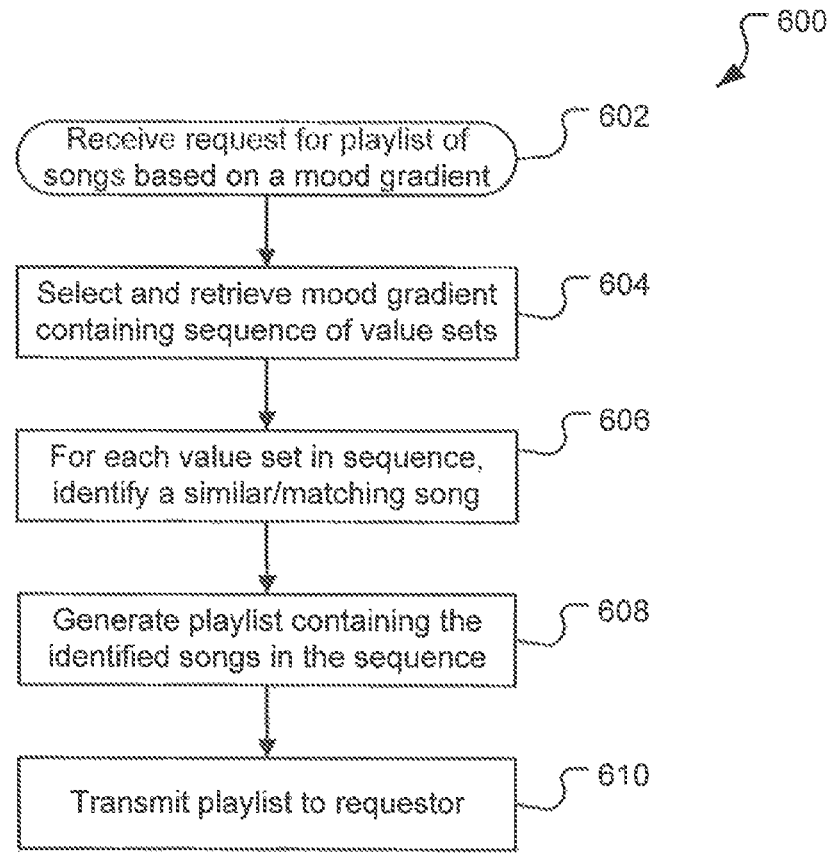
FIG. 6 illustrates an embodiment of a method for generating a playlist based on a mood gradient.

FIG. 6 illustrates an embodiment of a method for generating a playlist based on a mood gradient. As discussed previously, a mood gradient refers to a sequence of song characteristics. The mood gradient is used as a template from which songs are selected. While an existing playlist may be used to create a mood gradient, for example by determining and storing the characteristics of the songs in the playlist as a mood gradient, a playlist is not a mood gradient. Alternatively, a list of specified characteristics, in which the characteristics do not correspond to any actual songs, in sequence is also a mood gradient. A graphical representation of one characteristic of items in a mood gradient is illustrated in FIG. 7.

Figure 7:
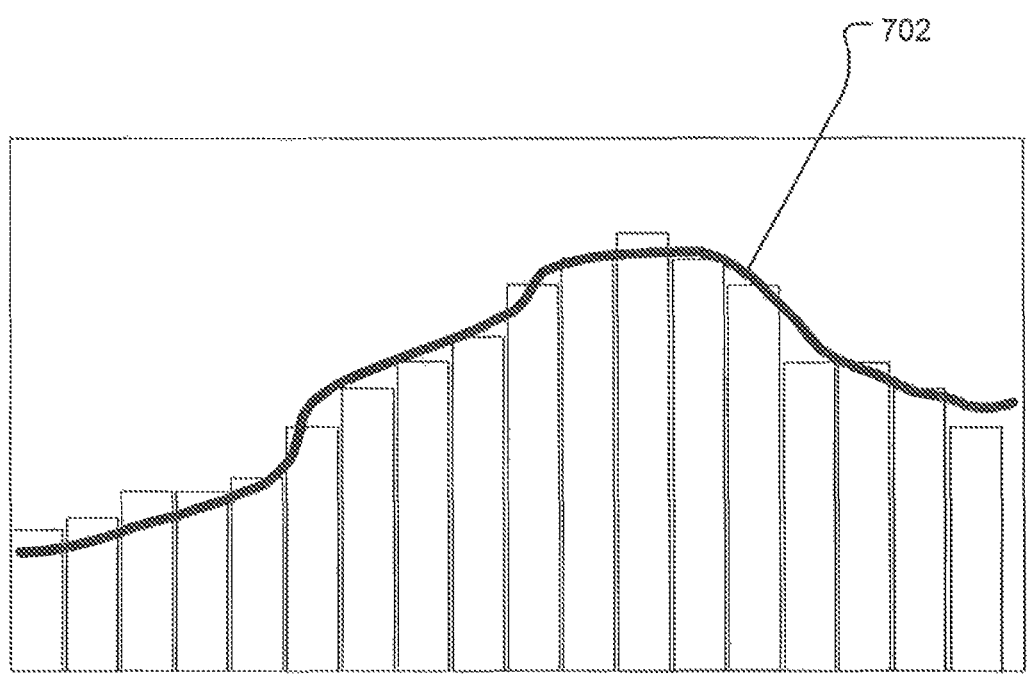
FIG. 7 illustrates a graphical representation of the values for one characteristic of items in a mood gradient.

FIG. 7 illustrates a graphical representation of the values for one characteristic of items in a mood gradient, for example tempo in beats per minute. The mood gradient is divided into 18 items. The value of the characteristic is illustrated by the height of a bar, with each bar corresponding to a different item/listing in the mood gradient. In tracing the height of the bar through the songs, one comes up with a gradient curve over the course of the 18 songs for the characteristic. For example, FIG. 7 could be the characteristic of tempo in which each bar represents a different song and the height represents a tempo value. Thus, as illustrated by the mood gradient of FIG. 7, the tempo slowly increases until reaching a maximum at about the $11^{th}$ or $12^{th}$ song. Then the tempo trails off. Depending on the number of characteristics selected for the individual items in the mood gradient, multiple gradient curves can be generated to illustrate the various changes in each characteristic.

While FIG. 7 illustrates one-dimension (i.e., one characteristic) of a mood gradient in both bar graph and gradient curve, the path 50 of FIG. 4B may be considered to illustrate three-dimensions of a mood gradient as a curve through the three-dimensional space. This illustrates one aspect of a mood gradient: that the mood gradient may be considered a list of points or a defined path through multi-dimensional space corresponding to the objective characteristic data of the songs known to the system.

Returning now to FIG. 6, in the method 600, a user requests a playlist be created based on a mood gradient. This request is received in a receive request operation 602. The request may identify a pre-existing mood gradient or may provide the data of the mood gradient. e.g., the characteristic values of songs comprising individual items of the mood gradient. The mood gradient identified may be one that was previously created by the user issuing the request or by one generated by some other user to which the requestor or the system has access. In the embodiment shown, the mood gradient is a set of at least three characteristics (e.g., values associated with a characteristic identifier) in a sequence and the user is requesting a new playlist be dynamically generated in which each song in the new playlist is similar in characteristics to the characteristics in the mood gradient. In an embodiment, the mood gradient is provided with the request. In an alternative embodiment, the request identifies a predetermined mood gradient known to the system or information that allows the system, based on its knowledge of the user, to identify a mood gradient.

After receiving the request, the mood gradient is located and retrieved in a retrieve operation 604. The mood gradient may be retrieved from the request itself or from a storage location. In an embodiment, further querying may need to be performed as part of the retrieve operation 604. For example, the user may have specified only a category or a type of mood gradient, e.g., "I am feeling mellow today", and further selection may be necessary to identify and obtain an actual mood gradient. Ultimately, however, the mood gradient is retrieved in the retrieve operation 604. In the embodiment, the mood gradient includes a sequence of value sets, each value set containing a group of values, in which each value (or subset of values for characteristics with complex mathematical representations) describes a different objective characteristic of a song.

After the mood gradient has been retrieved, for each value set in the sequence of the mood gradient a similar or matching song is identified in an identify similar song operation 606. This operation may be done using any known similarity matching algorithm. For example, all songs within some threshold, e.g., ±5%, of the target values in the mood gradient for each characteristic may be identified and then a random selection made from the set of identified songs. As another example, a simple weighting algorithm may be used to find a song similar to a given value set. For instance, given a target value set having values $(x_1, y_1, z_1)$ for three characteristics, all songs known in to the system may be ranked based on the following algorithm:

$$\text{Ranking for song } n = \alpha(x_1-x_n)^2 + \beta(y_1-y_n)^2 + \gamma(z_1-z_n)^2$$

In which algorithm, the factors $\alpha$, $\beta$, and $\gamma$ are weighting factors predetermined by the system administrator. Other algorithms and methods of selecting songs similar to a target set of values are known in the art and any suitable method may be used in the identify similar song operation 606.

The set of identified songs may also be filtered based on other factors such as user consumption history (so as not to repeatedly select songs that have been recently rendered) and user preferences (so as not to play songs the user has rated as disliked by the user). Any suitable method for selecting songs based on a comparison of that song's characteristics with a seed set of characteristics may be used in the identify similar song operation 606.

After a similar song for each value in the mood gradient set has been selected, a playlist is generated in a generate playlist operation 608. The playlist contains each of the selected songs in its appropriate position in the sequence of the mood gradient. The playlist thus generated may be in any form, including those described above with reference to FIG. 5.

After the playlist has been generated, it is then transmitted to the user's device in a transmission operation 610. In a client-server embodiment, this operation 610 may include determining what playlist form is appropriate for the client device and reformatting the music or the playlist to meet the device requirements. In a local embodiment, transmission may be a simple matter of placing the list of songs the media player queue for playback in the appropriate order.

Depending on the nature of the original request, what is transmitted to the user may be the songs identified in the identification operation 606, transmitted or streamed to the rendering device of the user in the sequence of the mood gradient. Alternatively, the playlist generated could be a playlist in some known playlist format such as an RSS or Atom feed and that feed file transmitted to the rendering device. Upon selection by the rendering device, the feed file is then accessed as is known in the art in order to retrieve the songs in the sequence and render them to the user whenever the user so desires.

The method 600 may be used by a user in order to customize the user's audio experience. For example, as discussed above, a user may have a specific mood gradient for use when the user is exercising. The mood gradient may start off with certain tempo, brightness and beatedness characteristics for songs and then, at a predetermined point, the tempo may be increased in order to assist the user in increasing the user's level of effort during the exercise routine. Alternatively, a mood gradient may be designed for a work environment that, for example, during the course of a work day, may begin with music having certain characteristics and at predetermined points in the mood gradient changed to music having other characteristics reflecting the nature of the work day expected to be experienced by the user.

Thus, a user may create multiple mood gradients over time or obtain them from other sources. Each time the user requests a playlist based on one of the mood gradient, the user will receive songs having the same characteristics at the same points in the sequence. However, the songs themselves will differ. In an embodiment, a user may even be able to request most songs to be played twice or selected twice within a predetermined or selected period of time. For example, a user may use the same mood gradient every day for a month with a particular song heard no more than once per week.

The method of FIG. 6 may also be used to generate a different set of songs from a pre-existing playlist. For example, a user may issue a request to the system for a pre-existing playlist to be used as a mood gradient and to generate a new playlist based on the pre-existing playlist. In response, the system may search the listing of songs in the playlist and identify the appropriate value sets for each song. This information could then be passed to a similarity selection module with a request to select songs based on the information. The songs are selected and then the generated playlist transferred back to the media player application for rendering.

Figure 8:
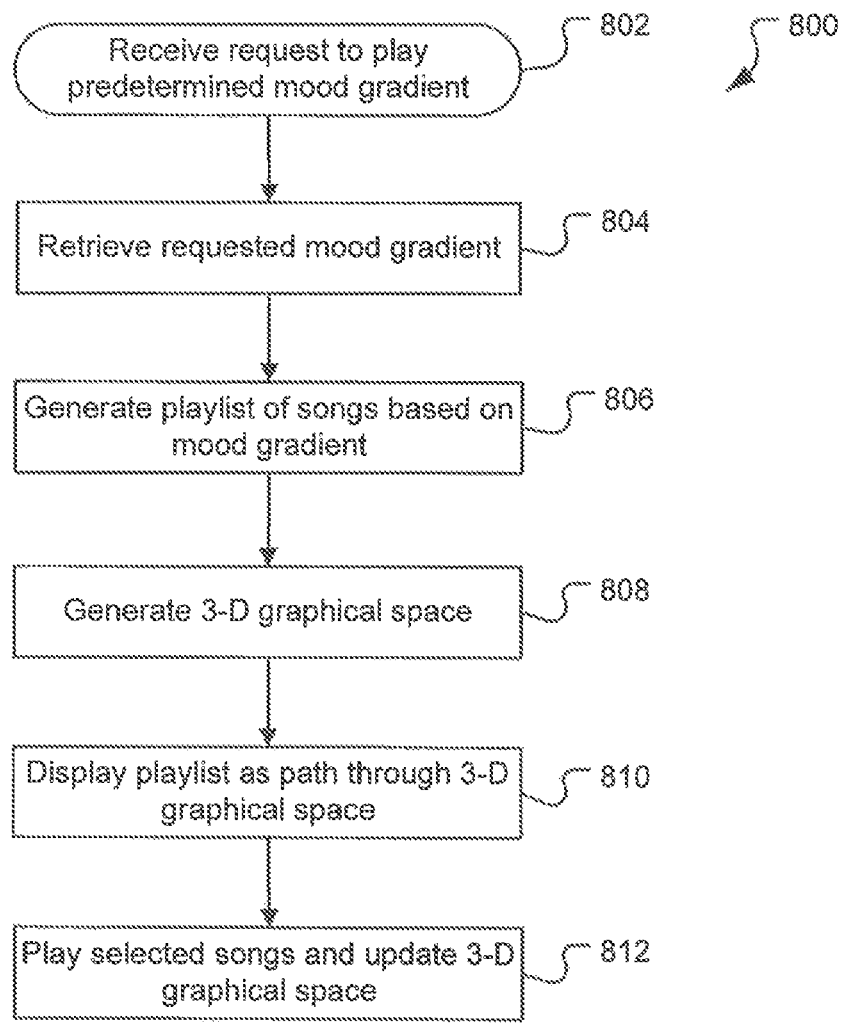
FIG. 8 illustrates yet another embodiment of a method of selecting songs based on a mood gradient and displaying the playlist to the user in the media discovery interface.

FIG. 8 illustrates yet another embodiment of a method of selecting songs based on a mood gradient and displaying the playlist to the user in the media discovery interface. In the embodiment shown, the user issues a request to play a predetermined mood gradient. The request identifies the mood gradient and may or may not contain the value sets for each of the songs in the sequence of the mood gradient.

The request is received in a receive request operation 802. If the information necessary to select the songs is not within the request, a retrieve requested mood gradient operation 804 is performed as described above. Next, a playlist of songs based on the mood gradient is generated in a generation operation 806 as described above.

After the playlist has been generated, a three-dimensional space is generated in a generate interface operation 808. Next, the playlist is displayed as a path through the three-dimensional graphical space in a display playlist operation 810. The path may connect the icons in the space that represent the songs of the playlist. Alternatively, the path may connect points corresponding to the various items (sets of characteristic values) of the mood gradient. This allows the user to visualize the changes in the characteristics of the songs that will occur as the songs are rendered.

The display playlist operation 810 includes populating the three-dimensional graphical space of the interface with at least the songs selected for the playlist in the generate playlist operation 806. Other songs may also be included as being displayed as icons in the three-dimensional graphical space. For example, songs not within the playlist but that are close to the songs in the playlist in the three-dimensional space may also be displayed.

The songs of the playlist are then played in their sequence to the user in a play songs operation 812. As the songs are played, each icon may be changed, highlighted, rotated, spun or otherwise emphasized as its corresponding song is being played to the user. The view shown by the three-dimensional space may also be adjusted as different songs are rendered. For example, the relative view of three-dimensional space may be adjusted as each song is rendered so that each songs currently being rendered is the center of the view.

During the play operation 812, if a user issues a skip command, the method will cease rendering the current song in the playlist and skip to the next song in the playlist, which will have been selected as similar to the item in the mood gradient. This is one difference between the generating a playlist from a mood gradient and generating an entire playlist from a single seed song (wherein a skip command results in another song similar to the same seed set of characteristics, such as the next most similar song).

The user may also be given the ability to change songs at different points in the playlist by dragging the path so that one icon is no longer in the path and another icon is. In this way, the user may "tweak" a playlist generated from a mood gradient to include songs that the user particularly wants to hear and which are still similar or very close to the characteristics of the mood gradient.

Figure 9:
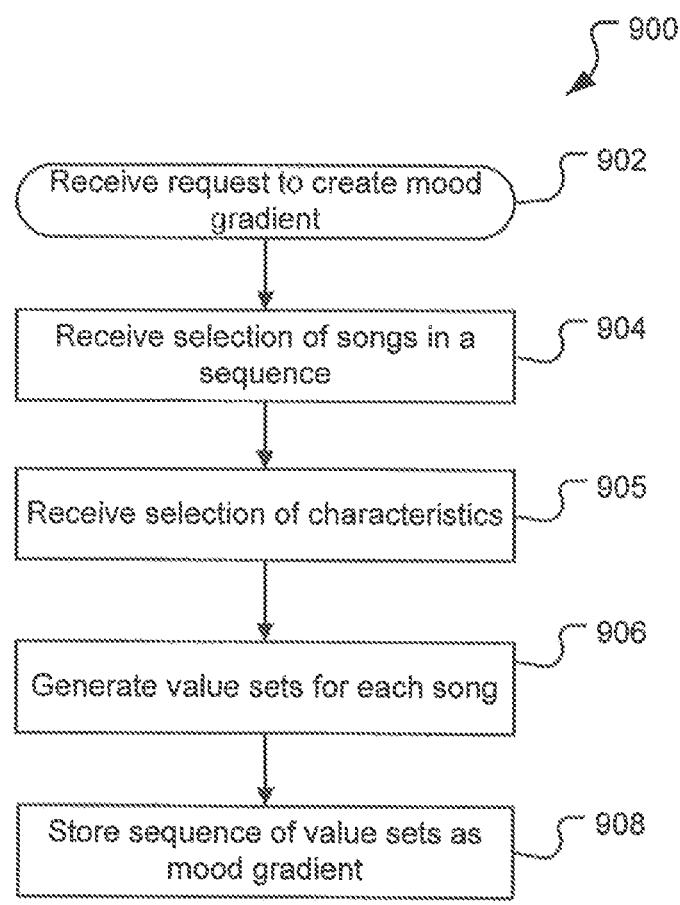
FIG. 9 illustrates an embodiment of a method for creating a mood gradient.

FIG. 9 illustrates an embodiment of a method for creating a mood gradient. In the method 900, a user issues a request to create a mood gradient that is received in a receive request operation 902. Either the request contains a selection of songs or the user is, in response to the receiving operation, prompted to make a selection of songs in order to create the mood gradient. The user's selection of songs is then received in a receive song selection operation 904. The selection of songs may include an identification of each song in the mood gradient and its location within the sequence making up the mood gradient.

The method 900 may also include a receive characteristics selection operation 905 in which the user selects a set of one or more characteristics for the system to store in the mood gradient. As discussed above, any number of characteristics may be used in items in the mood gradient. This allows the user maximum flexibility to select a mood gradient based on any characteristic or set of characteristics that the system can determine from music data. In an alternative embodiment, the method 900 may include selecting a fixed set or a default set of characteristics to use and the receive characteristics selection operation 905 may be omitted.

After the selection of songs has been received, a generate value sets operation 906 is performed. The generate value sets operation 906 may include analyzing each song using an analysis module as discussed above or may include retrieving value sets previously generated for each of the songs selected for the mood gradient. In yet another embodiment, a combination of both retrieval and generation may be performed, especially in a case in which a selected song is not known to the system creating the mood gradient.

After the value sets have been generated, the mood gradient is stored as a sequence of value sets in a storage operation 908. Storage may include storing an identification of the user who created the mood gradient as well as an identification of when the mood gradient was created and a description of what the mood gradient is or is for.

The mood gradient may include both an identifier of the songs in the mood gradient and the value sets for the songs. If so, the mood gradient may then be published as a mood gradient and used either as a mood gradient or a playlist.

In the embodiment of the method 900 shown in FIG. 9 and discussed above, the user creates a mood gradient by selecting songs from which the individual characteristic value sets are derived. In an alternative embodiment not shown, the user may provide or directly select the individual characteristic value sets. In such an alternative embodiment, the receive song selection operation 904, receive characteristics selection operation 905 and generate value sets operation 906 are replaced by a receive characteristics operation (not shown).

The systems and methods described herein may also be used for the ordering of a set of songs or other media objects. The ordering of a set of media tracks can determine the quality of the media consumption experience. In the case of an existing playlist, audio features and characteristics may be used to find the smoothest path between all the tracks in the playlist and generate an optimal ordering. Ordering may also be used to filter the results of a search request, returning only those media objects which fit both the search and ordering requirements.

In an embodiment, a user may create a gradient curve for one or more characteristics, such as the curve 702 shown in FIG. 7. These curves may be created by drawing a line through the three-dimensional space, or by some other input from the user. For a given dataset, there may be many possible songs selections which generally fit the curve the user has proposed. Therefore, a user can define a specific curve they are interested in—say perhaps the ordering of music they like to hear over the course of an afternoon or a Saturday night—and have different media objects fill in the results each day. We can also use compound features such as "mood" to provide finer granularity and incorporate multiple features such as tempo, brightness and beatedness—possibly all restricted to a certain genre, artist or other piece of traditional metadata.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server level or both. In this regard, any number of the features of the different embodiments described herein may be combined into single or multiple embodiments, and alternate embodiments having fewer than, or more than, all of the features described herein are possible. In addition, methods described in the foregoing disclosure may be adjusted by performing the operations in a different order. For example, some operations may be performed either in anticipation of another operation or dynamically as needed while providing the end result as described.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure. For example, the media discovery interface could be provided with additional features that make it suitable for an ongoing display during the rendering of media objects. As another example, as a song is being rendered, the interface could display information, including advertisements relative to the currently rendered song, that are relevant to the song being rendered. As another example, the mood gradient could contain any number of characteristics for each item in the gradient allowing for finer granularity in the selection of the songs matching the gradient. As another example, the mood gradient could be a simple starting point and ending point and the user may request a playlist containing any number of songs that create a relatively direct path between the two identified points. The system would then return the appropriate length playlist with songs on a known "trajectory" between the two points.

Numerous other changes may be made that will readily suggest themselves to those skilled in the art and which are encompassed in the spirit of the invention disclosed and as defined in the appended claims.

What is claimed is:

1. A method comprising:
receiving a request for a playlist of songs, the request comprising a requested mood;
retrieving a defined mood gradient corresponding to the requested mood, the mood gradient comprising a sequence of target value sets corresponding to the requested mood, each target value set in the sequence including a plurality of values in which each value represents a different objective musical characteristic;
for each target value set in the mood gradient's sequence of target value sets, selecting a song based on the plurality of values in the target value set; and
generating the playlist of songs in accordance with the requested mood using the mood gradient's sequence of target value sets, the playlist containing each selected song, the songs included in the playlist being ordered in accordance with the sequence of target value sets in the mood gradient.

2. The method of claim 1, wherein retrieving a defined mood gradient further comprises:
identifying a user associated with the request; and
selecting the defined mood gradient based on the user associated with the request and the requested mood.

3. The method of claim 1, wherein retrieving a defined mood gradient further comprises:
selecting the defined mood gradient based on a mood gradient identifier contained in the request, the mood gradient identifier identifying the requested mood.

4. The method of claim 1, the selecting a song further comprising:
for a target value set of the mood gradient:
retrieving a value set for each song of a plurality of songs, each song's value set being based on audio data of the song and comprising a plurality of values in which each value represents a different objective musical characteristic of the song;
comparing the target value set to each song's retrieved value set; and
selecting a song from the plurality of songs corresponding to the target value set based on the comparison.

5. The method of claim 4, the selecting a song from the plurality of songs further comprising:
selecting the song having the song value set that most closely matches the target value set.

6. The method of claim 4, the selecting a song from the plurality of songs further comprising:
identifying a set of similar songs having song value sets within a predetermined variation of the target value set; and
randomly selecting the song from the set of similar songs.

7. The method of claim 4, the selecting a song from the plurality of songs further comprising:
identifying a set of similar songs having song value sets within a predetermined variation of the target value set;
filtering the set of similar songs based on one or more filter criteria; and
selecting the song from the filtered set of similar songs.

8. The method of claim wherein the request for a playlist is received from a first user and the mood gradient was created by a second user different from the first.

9. A system comprising:
at least one computing device, each computing device comprising a processor and a non-transitory storage medium for tangibly storing thereon program logic for execution by the processor the stored program logic comprising:
receiving logic executed by the processor for receiving a request for a playlist of songs, the request comprising a requested mood;
retrieving logic executed by the processor for retrieving a defined mood gradient corresponding to the requested mood, the mood gradient comprising a sequence of target value sets corresponding to the requested mood, each target value set in the sequence comprising a plurality of values, each value of the plurality in the target value set representing a different objective musical characteristic;
selecting logic executed by the processor for selecting, for each target value set in the mood gradient's sequence of target value sets, a song based on the plurality of values in the target value set; and
generating logic executed by the processor for generating the playlist of songs in accordance with the requested mood using the mood gradient, the playlist comprising each selected song, songs selected for the playlist being ordered in accordance with the sequence of target value sets in the mood gradient.

10. The system of claim 9, the retrieving logic executed by the processor for retrieving further comprising:
identifying logic executed by the processor for identifying a user associated with the request; and
selecting logic executed by the processor for selecting the defined mood gradient based on the user associated with the request and the requested mood.

11. The system of claim 9, the retrieving logic executed by the processor for retrieving a defined mood gradient further comprising:
selecting logic executed by the processor for selecting the defined mood gradient based on a mood gradient identifier contained in the request, the mood gradient identifier identifying the requested mood.

12. The system of claim 9, the selecting logic executed by the processor for selecting a song further comprising:
for a target value set of the mood gradient:
retrieving logic executed by the processor for retrieving a value set for each song of the plurality of songs, each song's value set being based on audio data of the song and comprising a plurality of values in which each value represents a different objective musical characteristic of the song;
comparing logic executed by the processor for comparing the target value set to each song's retrieved value set; and
selecting logic executed by the processor for selecting a song from the plurality of songs corresponding to the target value set based on the comparison.

13. The system of claim 12, the selecting logic executed by the processor for selecting a song from the plurality of songs further comprising:
selecting the song having the song value set that most closely matches the target value set.

14. The system of claim 12, the selecting logic executed by the processor for selecting a song from the plurality of songs further comprising:
identifying logic executed by the processor for identifying a set of similar songs having song value sets within a predetermined variation of the target value set; and
selecting logic executed by the processor for randomly selecting the song from the set of similar songs.

15. The system of claim 12, the selecting logic executed by the processor for selecting a song from the plurality of songs further comprising:
identifying logic executed by the processor for identifying a set of similar songs having song value sets within a predetermined variation of the target value set:
filtering logic executed by the processor for filtering the set of similar songs based on one or more filter criteria; and
selecting logic executed by the processor for selecting the song from the filtered set of similar songs.

16. A computer-readable non-transitory storage medium for tangibly storing thereon computer readable instructions that when executed cause at least one processor to:
receive a request for a playlist of songs, the request comprising a requested mood;
retrieve a defined mood gradient corresponding to the requested mood, the mood gradient comprising a sequence of target value sets corresponding to the requested mood, each target value set in the sequence comprising a plurality of values, each value of the plurality in the target value set representing a different objective musical characteristic;
select, for each target value set in the mood gradient's sequence of target value sets, a song based on the plurality of values in the target value set; and
generate the playlist of songs in accordance with the requested mood using the mood gradient's sequence of target value sets, the playlist containing each selected song, the songs included in the playlist being ordered in accordance with the sequence of target value sets in the mood gradient.

17. The computer-readable non-transitory storage medium of claim 16, the instructions further comprising instructions to:
for the target value set of the mood gradient:
retrieve a value set for each song of the plurality of songs, each song's value set being based on audio data of the song and comprising a plurality of values in which each value represents a different objective musical characteristic of the song;
compare the target value set to each song's retrieved value set; and
select a song from the plurality of songs corresponding to the target value set based on the comparison.

18. The computer-readable non-transitory storage medium of claim 17, the instructions to select further comprising instructions to:
select the song having the song value set that most closely matches the target value set.

19. The computer-readable non-transitory storage medium of claim 17, the instructions to select further comprising instructions to:
identify a set of similar songs having song value sets within a predetermined variation of the target value set; and
randomly select the song from the set of similar songs.

20. The computer-readable non-transitory storage medium of claim 17, the instructions to select further comprising instructions to:
identify a set of similar songs having song value sets within a predetermined variation of the target value set:

filter the set of similar songs based on one or more filter criteria; and
select the song from the filtered set of similar songs.

\* \* \* \* \*